(12) United States Patent
Boyer et al.

(10) Patent No.: US 9,379,571 B2
(45) Date of Patent: Jun. 28, 2016

(54) ELECTRICAL CHARGING SYSTEM HAVING ENERGY COUPLING ARRANGEMENT FOR WIRELESS ENERGY TRANSMISSION THEREBETWEEN

(75) Inventors: Richard J. Boyer, Mantua, OH (US); Brian D. Pasha, Cortland, OH (US); John Victor Fuzo, Cortland, OH (US)

(73) Assignee: Delphi Technologies, Inc., Troy, MI (US)

(*) Notice: Subject to any disclaimer, the term of this patent is extended or adjusted under 35 U.S.C. 154(b) by 1066 days.

(21) Appl. No.: 13/450,881

(22) Filed: Apr. 19, 2012

(65) Prior Publication Data
US 2013/0015812 A1    Jan. 17, 2013

Related U.S. Application Data

(60) Provisional application No. 61/506,242, filed on Jul. 11, 2011.

(51) Int. Cl.
*H02J 7/00* (2006.01)
*B60K 1/00* (2006.01)
*B60K 6/20* (2007.10)
(Continued)

(52) U.S. Cl.
CPC ............ *H02J 7/025* (2013.01); *B60L 11/182* (2013.01); *B60L 11/1848* (2013.01); *B60L 11/1827* (2013.01); *B60L 11/1829* (2013.01); *B60L 2240/62* (2013.01); *Y02T 10/7005* (2013.01); *Y02T 10/7072* (2013.01); *Y02T 10/7094* (2013.01); *Y02T 10/7291* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/16* (2013.01);
(Continued)

(58) Field of Classification Search
CPC ............................ H02J 7/025; B60L 11/1848
USPC ............ 320/108, 109; 180/65.1, 65.21, 65.29
See application file for complete search history.

(56) References Cited

U.S. PATENT DOCUMENTS

| | | | |
|---|---|---|---|
| 4,496,896 | A | 1/1985 | Melocik et al. |
| 6,150,794 | A | 11/2000 | Yamada et al. |

(Continued)

FOREIGN PATENT DOCUMENTS

| | | |
|---|---|---|
| CN | 101835653 A | 9/2010 |
| CN | 102055250 A | 5/2011 |

(Continued)

*Primary Examiner* — Richard V Muralidar
(74) *Attorney, Agent, or Firm* — Robert J. Myers

(57) ABSTRACT

An electrical charging system configured to charge a battery includes a power transmitter, an energy coupling arrangement, an electrical signal shaping device including a controller, and an alignment means. The arrangement includes a first inductive coil disposed external to the vehicle and a second inductive coil attached with the vehicle. The alignment means communicates with the vehicle to ensure repeatable vehicle positioning so that the second inductive coil is positioned relative to the first inductive coil so that the second inductive coil receives the energy produced by the power transmitter wirelessly transmitted from the first inductive coil. The energy received by the second inductive coil is electrically shaped by the electrical signal shaping device and further transmitted through the electrical signal shaping device as controlled by the controller to charge the battery. Methods for transmitting energy through the electrical charging system to charge the battery are also presented.

9 Claims, 16 Drawing Sheets

(51) Int. Cl.
  *B60W 10/24* (2006.01)
  *H02J 7/02* (2016.01)
  *B60L 11/18* (2006.01)

(52) U.S. Cl.
  CPC .............. *Y02T90/162* (2013.01); *Y02T 90/163* (2013.01); *Y02T 90/169* (2013.01); *Y04S 30/14* (2013.01)

(56) References Cited

U.S. PATENT DOCUMENTS

| | | |
|---|---|---|
| 6,198,244 B1 | 3/2001 | Hayden et al. |
| 8,716,974 B2 | 5/2014 | Sakoda et al. |
| 8,841,881 B2 * | 9/2014 | Failing .............. 307/65 |
| 8,937,454 B2 * | 1/2015 | Baarman ............... B60L 11/182 180/65.1 |
| 2006/0284593 A1 | 12/2006 | Nagy et al. |
| 2011/0204845 A1 | 8/2011 | Paparo et al. |
| 2012/0032525 A1 | 2/2012 | Oyobe et al. |

FOREIGN PATENT DOCUMENTS

| | | |
|---|---|---|
| JP | 2010-68634 A | 3/2010 |
| WO | 2005029098 | 3/2005 |

* cited by examiner

ELECTRICAL CHARGING SYSTEM HAVING ENERGY COUPLING ARRANGEMENT FOR WIRELESS ENERGY TRANSMISSION THEREBETWEEN

RELATED DOCUMENTS

This application claims priority to provisional application U.S. Ser. No. 61/506,242 filed on 11 Jul. 2011.

TECHNICAL FIELD

This invention generally relates to systems and methods for electronically charging an energy storage device in a ground-based motorized vehicle.

BACKGROUND OF INVENTION

Electric vehicles and electric-hybrid vehicles are gaining in popularity with consumers. The electric motors in these vehicles are powered from a battery in the vehicle. If the battery is not self-regenerating, it may need to be electrically charged from a power source that may be located external to the vehicle.

Conventional vehicle battery charging systems include a coupler that may be plugged in to a vehicle to electrically charge the vehicle's battery. This type of electrical charging system is small enough to be portable with the vehicle and may be releasably coupled, or plugged in to a 120 VAC, 60 Hertz (Hz) power source that is commonly available in the United States. In one scenario, this system may charge a typical vehicle battery within ten (10) hours. While this electrical charging system works well, consumers may desire an electrical charging system that electrically charges the battery in a less amount of time. Consumers may also desire greater convenience to electrically charge the vehicle's battery from an electrical power source without the need to physically plug the vehicle into the power source.

Thus, a reliable and robust vehicular electrical charging system is needed that enables repeatable electrical charging of a battery in a less amount of time than a conventional low voltage 120 VAC, 60 Hz electrical charging system and which provides user convenience and safety for the human operator of the electrical charging system.

SUMMARY OF THE INVENTION

At the heart of the present invention is the discovery of an electrical charging system that takes into consideration a variety of factors in combination to ensure the electrical charging system is reliable, safe, and more convenient for a human operator to operate and use. One factor is that an electrical connection system that operates at a voltage of greater than 120 VAC may electrically charge a battery in a less amount of time than the conventional 120 VAC electrical charger. A second factor is that an electrical connection system that operates at a frequency greater than 60 Hertz may also provide an electrical connection system that operates with an increased power system efficiency. A third factor is having repeatable, reliable positioning of the vehicle to align a transmit and receive inductive coils so that energy may be effectively wirelessly received by the receive coil so that the electrical charging system may electrically operate to electrically charge the battery. A fourth factor is that high voltage, high frequency electrical signals need to be reliably and safely electrically shaped and transmitted within the vehicle space with respect to the human operator also being disposed in the vehicular environment. A fifth factor is that the electrical charging system needs to effectively control the rate at which the electrical charge system electrically charges the battery. A sixth factor is to have a more simplified electrical charging system that has a decreased number of components. A seventh factor is to have an electrical charging system that includes both a high voltage, high frequency primary system and a lower voltage, 60 Hz secondary system that allow electrical charging of the battery in a variety of operating conditions encountered by the human operator when operatively using the vehicle for its intended transportation function. Having a primary and a secondary system provides further flexibility and ease of operation for the human operator of the electrical charging system. An eighth factor is having a variety of electrical/electronic configurations for on-vehicle shaping of the high power, high frequency signals dependent on the electrical application of use. A ninth factor is having an electrical charging system that provides audible or visual indication to the human operator if the electrical charging system is not operating as intended before the human operator leaves the local area where the electrical charging system is disposed. A tenth factor is having the ability to simultaneously electrically charge the electrical charging system in a plurality of vehicles.

In accordance with an embodiment of the invention, then, an electrical charging system is capable of electrically charging an energy storage device of a vehicle. The electrical charging system includes a power transmitter, an energy coupling arrangement that includes an off-vehicle inductive coil and an on-vehicle inductive coil, at least one electrical signal shaping device, and an alignment means. The power transmitter is configured to provide energy. The off-vehicle inductive coil of the energy coupling arrangement is disposed external to the vehicle. The off-vehicle inductive coil is in electrical communication with the power transmitter. An on-vehicle inductive coil of the energy coupling arrangement is disposed on the vehicle. The on-vehicle inductive coil is configured to receive at least a portion of the energy wirelessly transmitted from the off-vehicle inductive coil. The electrical signal shaping device is in electrical communication with the on-vehicle inductive coil to electrically shape at least a portion of the received energy and electrically transmit the electrically-shaped energy to electrically charge the energy storage device. The alignment means is configured to communicate with the vehicle to ensure that the vehicle is positioned relative to the off-vehicle inductive coil of the energy coupling arrangement such that the on-vehicle inductive coil receives the energy wirelessly transmitted from the off-vehicle inductive coil.

In accordance with another embodiment of the invention, a method is presented to operate an electrical charging system in which the electrical charging system is used to electrically charge an energy storage device disposed on a vehicle.

In accordance with a further embodiment of the invention, a further method is presented electrically charge an energy storage device by the transmission and acknowledgement of data messages within the electrical charging system.

In accordance with a further embodiment of the invention, a method is presented to transmit energy through an electrical charging system to electrically charge an energy storage device using reflected and received power measurements of the electrical charging system.

In accordance with yet another embodiment of the invention, an electrical charging system is in electrical communication with a multiswitch is presented in which the multiswitch is also in electrical communication with at least one other electrical charging system so that the multiswitch is configured to simultaneously electrically charge the respective energy storage devices disposed on a plurality of vehicles.

Further features, uses and advantages of the invention will appear more clearly on a reading of the following detailed description of the embodiments of the invention, which is given by way of non-limiting example only and with reference to the accompanying drawings.

BRIEF DESCRIPTION OF THE DRAWINGS

This invention will be further described with reference to the accompanying drawings in which:

FIG. 5A shows an electrical schematic of the power transmitter of FIG. 5;

DETAILED DESCRIPTION

Figure 1:
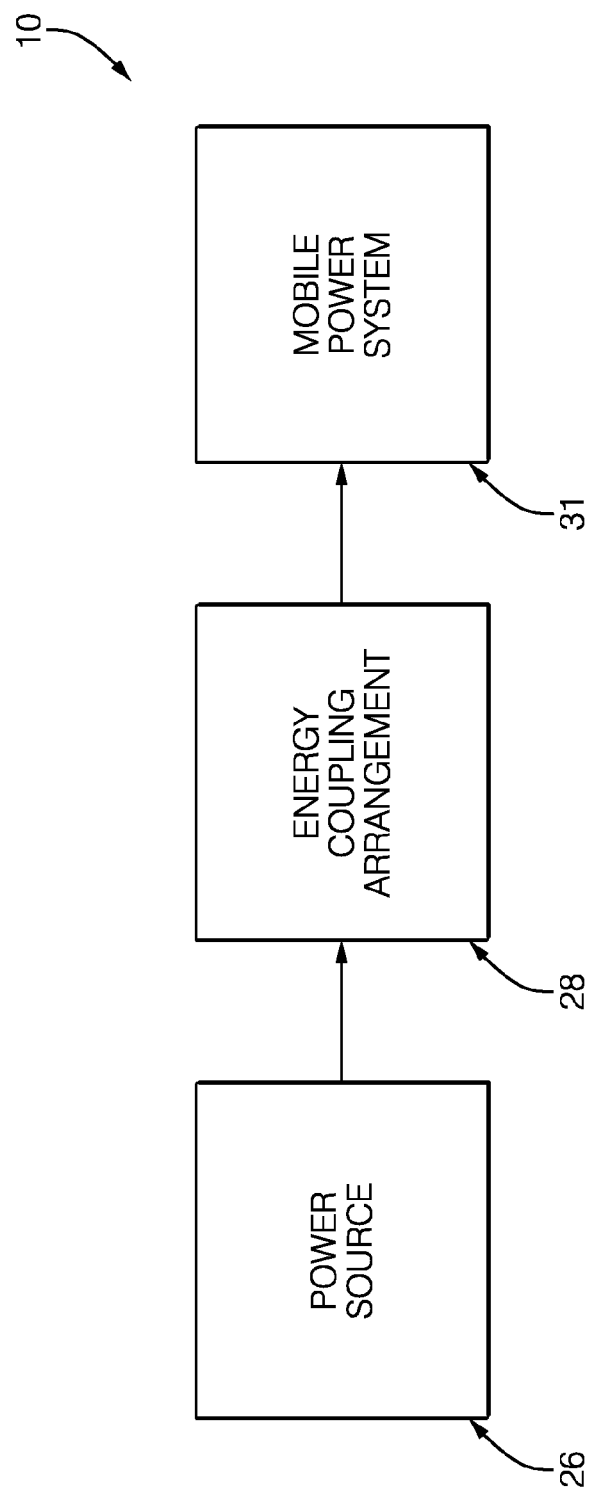
FIG. 1 shows an electrical charging system in simplified block diagram form that is configured to electrically charge an energy storage device in accordance with the invention.

A drivetrain of a vehicle is formed with a group of components in the vehicle that generate power and deliver this power through the tires of the vehicle that engage a road surface. A hybrid electric vehicle and an electrical vehicle each use a traction battery to power the drivetrain of their respective vehicles. A hybrid electrical vehicle uses a hydrocarbon fuel engine, or motor in combination with energy supplied by a battery disposed on the vehicle to power the drivetrain of a vehicle. An electric vehicle powers the drivetrain solely by using energy from an energy storage device, or battery. The traction battery of the hybrid electric vehicle and the electric vehicle may include a plurality of batteries connected in series or parallel connection to form a single battery. As the vehicle is driven, or otherwise used by a human operator of the vehicle, such as when powering the radio or windshield wipers apart from powering the drivetrain, the electrical charge on the battery may decrease, or become void of electrical charge. If this situation occurs, the battery needs to be electrically recharged back to a fully charged electrical state. Recharging a battery may be accomplished using an electrical charging system. The electrical charging system supplies the electrical charge to provide and fill the battery with electrical charge. A hybrid or electric vehicle's battery may be electrically charged using a plug-in 120 VAC, 60 Hertz (Hz) electrical charging system when the vehicle is not in motion, such as when parked. One such electrical charging system is described in U.S. Ser. No. 12/950,298 entitled "BATTERY CHARGER HAVING NON-CONTACT ELECTRICAL SWITCH" and another such system is described in U.S. Ser. No. 13/306,327, entitled "POWER SAFETY SYSTEM AND METHOD HAVING A PLURALITY OF THERMALLY-TRIGGERED ELECTRICAL BREAKING ARRANGEMENTS" each of which is incorporated by reference in their entirety herein. Returning the vehicle's battery to a full electrical charge using the electrical charging system ensures the user of the hybrid or electric vehicle is ready to travel a full distance range governed at least in part by the electrical charge state of the battery, or battery pack. Consistently and reliably electrically charging the battery in less time than that of a 120 VAC, 60 Hz electrical charging system is advantageous to enhance the readiness and usability of the vehicle to a human operator of the vehicle.

The following terms are used throughout the specification and are defined as follows:

Alignment Means—Structures that facilitate alignment of the vehicle so that the alignment of the inductive coils repeatedly occurs. Alignment means may include a wheel chock, a wheel stop, or a tire indention device. A wheel chock is one or more wedges of sturdy material placed ahead or behind a vehicle's wheels to prevent accidental movement of the vehicle. The bottom surface is sometimes coated in rubber to enhance grip with the ground. When used with the electrical charging system as described herein, preferably the wheel chock is positioned and secured to the ground surface using an adhesive or fasteners, and when engaged by the tires of the vehicle, ensures at least partial alignment of inductive coils of the electrical charging system with one of the inductive coils disposed on the vehicle and another inductive coil being disposed on the ground surface. One edge of the wedge may have a concave profile to contour to the wheel of the vehicle that increases the force necessary to overrun the chock. Another type of alignment means may be a tire indention device. When the wheel is disposed within the indention of the tire indention device, this provides indication to a driver of the vehicle that the inductive coils of the electrical charging system are in general alignment one-to-another so that an on-vehicle inductive coil may couple, or receive energy transmitted from the ground-based off-vehicle inductive coil. A lateral vehicle alignment member, such as a tennis ball extending on a string from a ceiling of a residential garage, may also assist in helping the driver of the vehicle position the vehicle so that the inductive coils are sufficiently aligned so that the on-vehicle inductive coil wirelessly receives the energy transmitted from the off-vehicle inductive coil. The tennis ball may be positioned in a predetermined position so that when a front portion of the vehicle engages the tennis ball along a mid-line of the vehicle the vehicle is positioned so that at least a portion of the on-vehicle inductive coil overlies the off-vehicle inductive coil and energy is transmitted/received therebetween.

Figure 3:
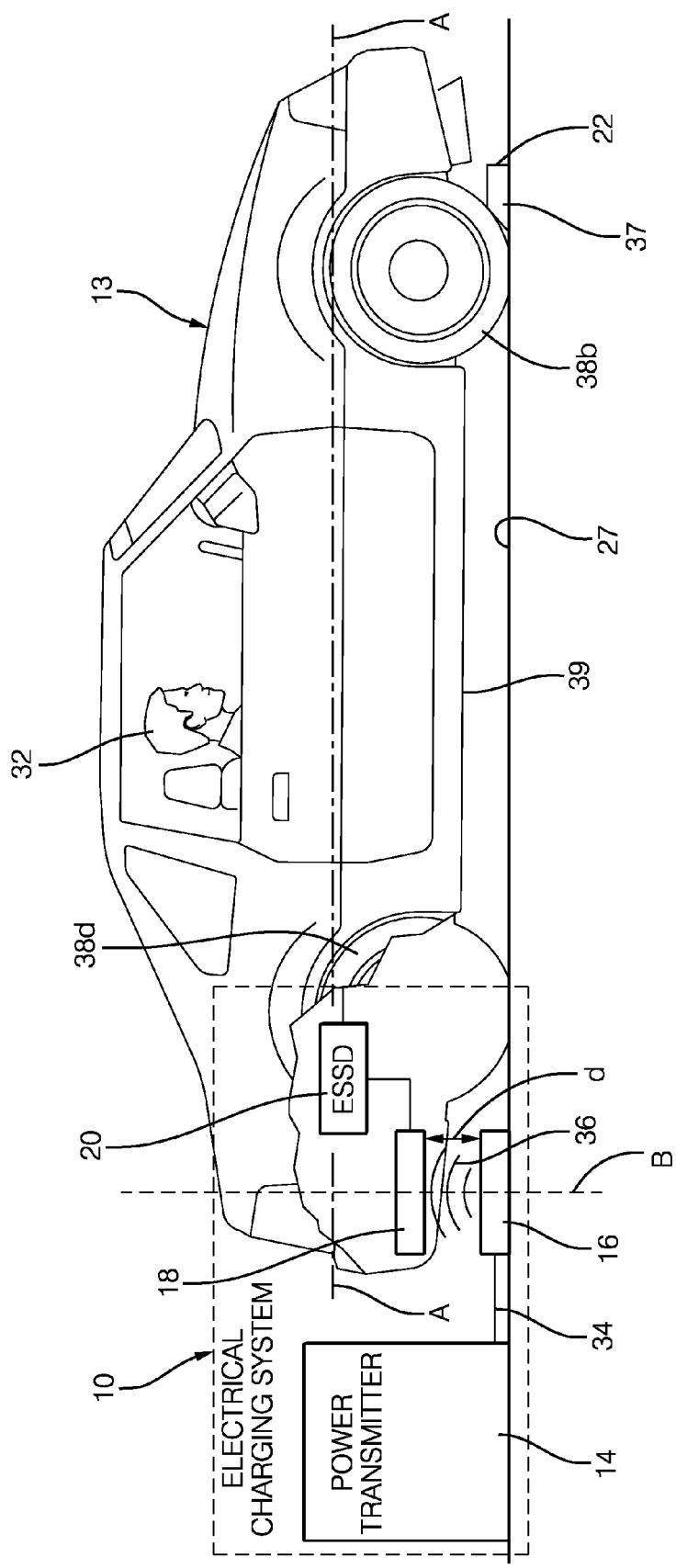
FIG. 3 shows the electrical charging system of FIG. 2, and further spatial details of the inductive coils thereof between a vehicle and a ground surface.

Alignment of Inductive Coils—The inductive coils may be considered aligned when the system power efficiency of the electrical charging system is greater than 75% between the inductive coils. For example, for inductive coils having a general size of 50 centimeters (cm)×50 cm with a z-axis direction of 20 cm having at least a 50% overlay of each area of the respective inductive coils may yield 75% or greater system power efficiency. In a general sense, if the system power efficiency of the electrical charging system is greater than 75%, whether or not a portion of respective areas of the inductive coils overlie one another, the inductive coils may be considered to be aligned one-to-another. For example, as best illustrated in FIG. 3, at least a portion of the area of the vehicular inductive coil preferably overlies at least a portion of the off-vehicle inductive coil secured to a ground surface underlying the vehicle.

Charger Electrical Device—An electrical device that takes one form of energy and converts it to a compatible form of energy to electrically charge the energy storage device of the vehicle. For example, this charger device may receive low frequency AC power and converts it to DC current that is used to subsequently electrically charge a battery in a safe, efficient manner. For instance, the low frequency AC power may have a 60 Hz frequency associated with it.

Energy Coupling Arrangement—The energy coupling arrangement is formed from the off-vehicle inductive coil and the on-vehicle inductive coil. The on-vehicle inductive coil wirelessly receives electromagnetic (EM) energy transmitted from the off-vehicle inductive coil. Preferably, the energy transfer is predominately through magnetic energy coupling.

Energy Storage Device—An electrical device that stores electrical charge. The energy storage device may also be referred to as a battery. The battery may be a single battery or a plurality of batteries formed in to a battery pack. For example, battery packs are typically found on electric or hybrid electric vehicles.

Electrical Charge System Power Efficiency—The amount of power input relative to the amount of power output of the electrical charging system. Typically, the system power efficiency may have a range from 0% to 100% with 100% being totally efficient with no loss of power between the input and the output. For some electrical applications it may be desired to have the highest system power efficiency as possible thereby having a percentage value closer to 100%. The system power efficiency may be affected by a number of factors one of which is the electrical components used to construct the electrical charging system which may affect the power loss through the electrical charging system. Also, this term may be referred to as 'system power efficiency.'

Electrical Signal Shaping Device—The electrical signal shaping device takes a form of energy as an input from the inductive coils, electrically shapes it in a manner suitable to electrically charge the energy storage device, and electrically transmits the shaped energy to the energy storage device. For instance, as described herein, the electrical signal shaping device is disposed on the vehicle electrically downstream from the on-vehicle inductive coil. The electrical signal shaping device may be packaged with in a single electronic module or a plurality of modules electrically connected together dependent on the application of use for an electrical charging system. For example, the electrical signal shaping device may only be a rectifier.

High Power Electrical Charging System—An electrical charging system that has a power output from the power transmitter of at least 900 watts. Preferably, this wattage value is within a range from 900 to 10,000 watts. In some embodiments, an electrical charging system having a power output from a power transmitter of less than 900 watts is not considered to be a high power electrical charging system. The power output of the high power electrical charging system generally also outputs an electrical signal that has a frequency that is greater than 60 Hz. The electrical charging system includes a power transmitter in electrical communication with a power source, an energy coupling arrangement that includes a first and a second inductive coil, and an electrical signal shaping device that includes a controller. The electrical charging system may also include an alignment means when used in vehicular applications that assists to properly align the second inductive coil in relation to the first inductive coil so that the second inductive coil receives energy from the first inductive coil when the electrical charging system is in operation. As illustrated in FIGS. 4-5, 12-15 various electrical signal designations are mapped along signal paths in the electrical charging system to better understand the levels of voltage and/or frequency levels of these electrical signals within the various electrical charging system embodiments. Alternatively, the electrical charging system may not include an alignment means and still be within the spirit and scope of the invention. These electrical signal designations are:

HV HF AC—A high voltage, high frequency alternating current (AC) electrical signal. Preferably, the voltage signal is greater than 120 VAC and the frequency of the voltage signal is greater than 60 Hz. The frequency may be in a range of 10 kHz to 450 kHz.

HV DC—A high voltage, direct current (DC) electrical signal. Preferably, the DC voltage is greater than 120 VDC.

60 Hz AC—A 60 Hz, AC voltage electrical signal. Generally, the AC voltage is either 120 VAC or 240 VAC dependent on the power source generating the voltage.

Figure 4:
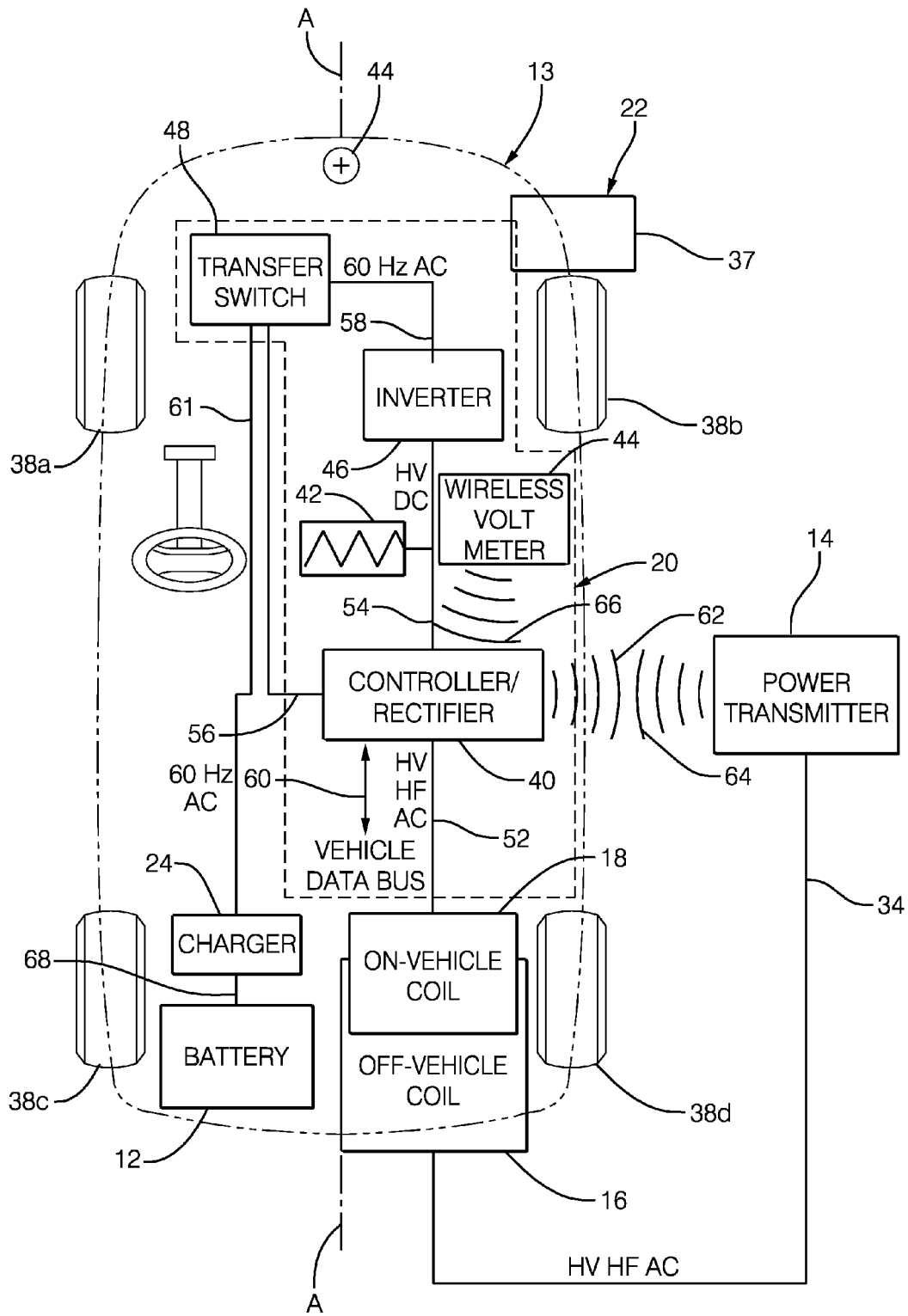
FIG. 4 shows yet another block diagram of the electrical charging system of FIG. 3, further showing vehicular electrical signal shaping device details thereof.
Figure 12:
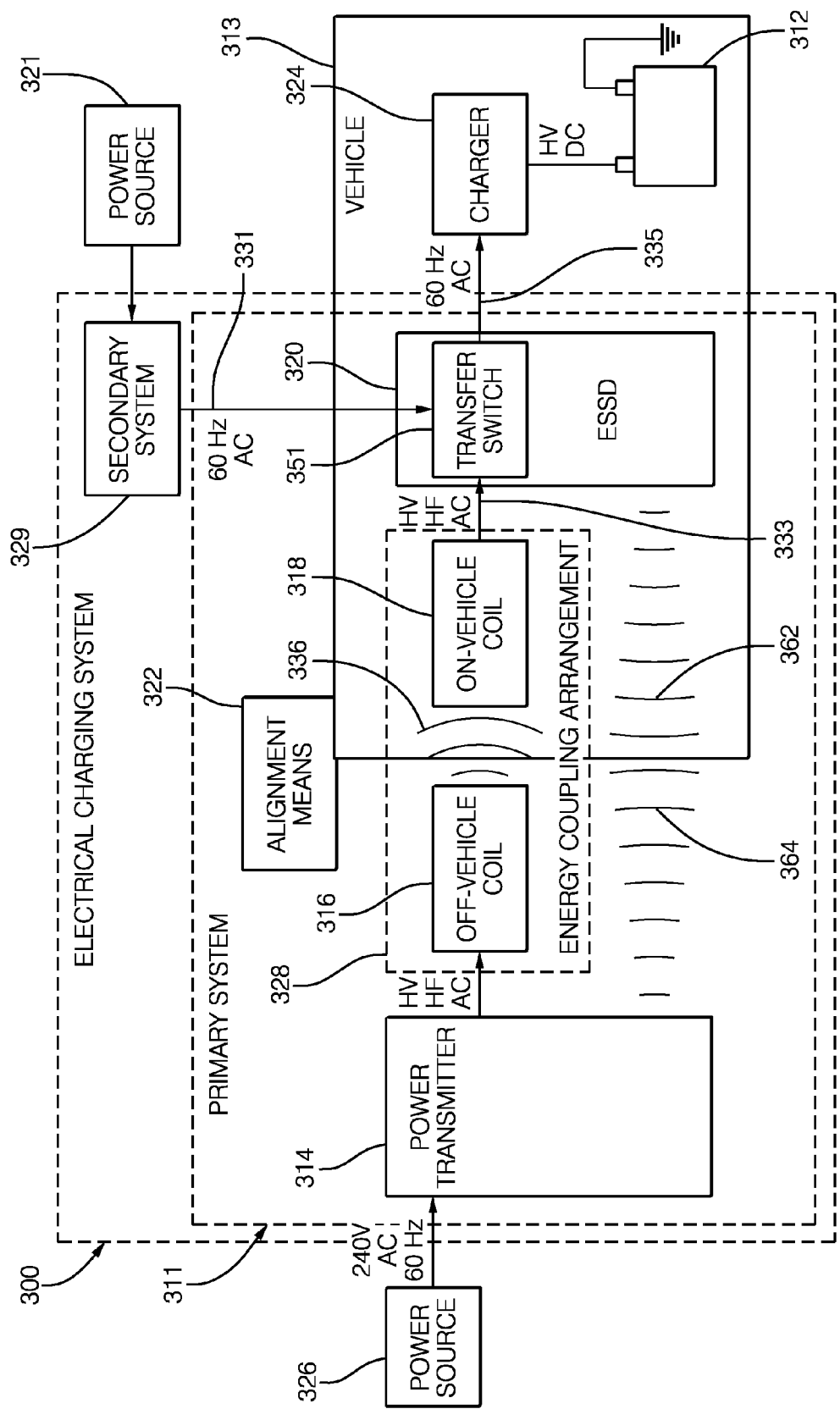
FIG. 12 shows an electrical charging system that includes a primary system similar to the embodiment of FIG. 2 and a 60 Hertz secondary system that electrically interfaces with the primary system, according to an alternate embodiment of the invention.

120 VAC or 240 VAC, 60 Hz—A 120 VAC or 240 VAC, 60 Hz electrical signal. For example, this may be an electrical signal supplied by the power source to the primary system (240 VAC) or the secondary system (120 VAC, plug-in), such as illustrated in FIGS. 4 and 12. The primary and/or the secondary system may be hardwired or pluggable dependent on the electrical application of use.

Power Source—This is power supplied by an electrical power grid such as is supplied by a power municipality. The high power electrical charging system electrically connects to a power source. A conventional 60 Hz electrical charging system also electrically connects with a power source. Preferably, the power source in electrical connection with the high power electrical charging system has a greater voltage than the power source in electrical communication with the 60 Hz electrical charging system.

Power Transmitter—An electrical device that is part of an electrical charging system. A single power transmitter advantageously includes a DC supply, an RF amplifier, a wireless communication control, and a user interface within a single housing making for a compact, efficient arrangement that may be mounted to wall in a garage, for example, or to a post. An integrated power transmitter allows for overall electrical charging system power efficiency to be attained versus having multiple electronic modules that might make up the functionality of power transmission. Multiple electronic modules may experience undesired loss of power that could otherwise result. The RF amplifier is in electrical communication with the DC supply. The first inductive coil is in electrical communication with an output of the RF amplifier. Preferably, the RF amplifier is capable of delivering a power of greater than 900 Watts at a frequency of greater than 60 Hertz (Hz). Preferably, the frequency has a range that is from 15 kHz to 450 kHz. Alternatively, the RF amplifier may also deliver a power of less than 900 Watts dependent on the operation mode of the electrical charging system and the electrical application of use. The wireless communication control wirelessly communicates with the controller portion of the electrical signal shaping device.

Received Power—An amount of energy received by the on-vehicle inductive coil.

Reflected Power—An amount of energy not able to be wireless transmitted by the off-vehicle inductive coil. For example, the reflected power energy is affected by power that has been lost through the electrical charging system en route to the battery.

Vehicle—A vehicle that typically has wheels in communication with a drivetrain driven by a motor or a fuel combustion engine. For an electric vehicle application the motor is an electric motor. The hybrid electric vehicle includes an electric motor used in combination with and fuel combustion engine to power the drivetrain of the vehicle.

Referring to FIGS. 1-4, in accordance with one embodiment of this invention, a high power electrical charging system 10 is configured to electrically charge an energy storage device 12 that further drives one or more electrical loads. In some vehicle applications, energy storage device 12 may be a traction battery. Energy storage device 12 is disposed on a ground-based vehicle 13 and configured to provide energy to operate a drivetrain (not shown) of vehicle 13. Alternatively, the energy storage device is not limited to supplying electrical current only to the drivetrain, but may also be used to operate any electrical or electrical/mechanical device that requires electrical current. Furthermore, the vehicle may be any type of vehicle that has an energy storage device, or battery that needs electrical charging and includes, but is not limited to a hybrid and/or a hybrid electric vehicle. Energy storage device 12 may be formed as a single battery or a plurality of batteries such as may be arranged in a battery pack. A first portion of electrical charging system 10 is disposed external to vehicle 13 and a second portion of electrical charging system 10 is disposed on vehicle 13. Vehicle 13 has a length disposed along a longitudinal axis A, as best illustrated in FIGS. 3 and 4, and is further disposed along a generally planar ground surface 27.

Figure 2:
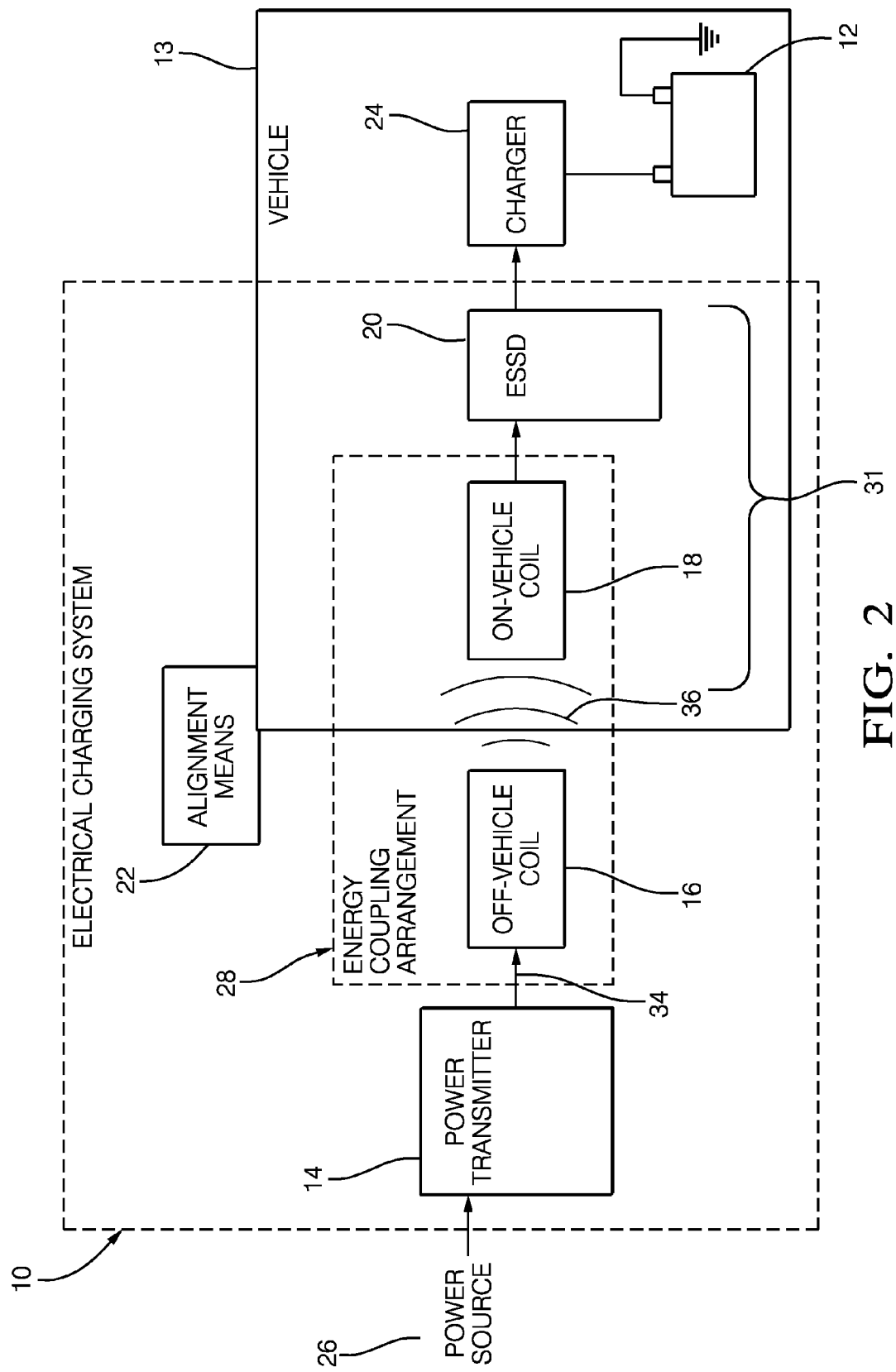
FIG. 2 shows a more detailed block diagram of the electrical charging system of FIG. 1, and further details thereof including an alignment means.

Referring to FIG. 2, electrical charging system 10 includes an integrally constructed power transmitter 14, a first, or off-vehicle inductive coil 16, a second, or on-vehicle inductive coil 18, at least one on-vehicle electrical signal shaping device 20, and an alignment means 22. As defined herein, 'off-vehicle' provides an indication that the device is disposed external to the vehicle and 'on-vehicle' provides an indication that the device is attached or disposed on the vehicle. Electrical charging system 10 including electrical signal shaping device 20 may be formed of any type of electrical/electronic devices in any type of circuit combination and may include resisters, capacitors, diodes, semiconductors, integrated circuits (ICs), relays, thermal fuses, thermistors, and thermocouples, inductive coils, coils and the like. The first portion of electrical charging system 10 disposed external to vehicle 13 includes power transmitter 14 and off-vehicle inductive coil 16 in electrical communication with power transmitter 14. Off-vehicle inductive coil 16 is fixedly secured to ground surface 27 with fasteners, such as bolts. The second portion of electrical charging system 10 is disposed on vehicle 13 includes on-vehicle inductive coil 18 and electrical signal shaping device 20 in downstream electrical communication with on-vehicle inductive coil 18. Vehicle 13 includes a charger 24 and battery 12 in downstream electrical communication with charger 24. Charger 24 is in disposed in downstream electrical communication from electrical signal shaping device 20. Power transmitter 14 is in downstream electrical communication with a fixed power source 26. Power source 26 has a voltage value that is greater than the 120 VAC, 60 Hz power source used to operate the pluggable, portable charging system as discussed previously in the Background. Preferably, fixed power source 26 has a voltage value of 220 or 240 VAC. Alternatively, the fixed power source in electrical communication with the power transmitter may have any voltage value that is greater than 120 VAC. As such, electrical charging system 10 is configured to electrically charge battery 12 in a lessor amount of time than the 60 Hz, 120 VAC pluggable, portable charge system previously discussed herein. When electrical charging system 10 is in electrical communication with fixed power source 26, electrical charging system 10 is configured to electrically charge battery 12.

Inductive coils 16, 18 form an energy coupling arrangement 28 and on-vehicle inductive coil 18 and electrical signal shaping device 20 form a mobile power system 31 of electrical charging system 10. Mobile power system 31 is carried with vehicle 13 as vehicle 13 movingly travels along a road. The on vehicle and off-vehicle inductive coils 16, 18 are constructed with a coil that may have a high quality factor (Q factor) and may be formed of Litz wire or copper tubing so that the coil has low resistance at the frequency of operation. Dependent on the electrical application, the Q factor may be greater than 100. The inductive coils may also include additional electrical components, such as resistors, capacitors, inductors and the like to ensure high efficiency transmission of the magnetic energy therebetween. Thus, mobile power system 31 is a vehicle-based subsystem that is disposed in downstream communication from energy coupling arrangement 28 and energy coupling arrangement 28 is disposed in downstream electrical communication from fixed power source 26, as best illustrated in FIG. 1. Electromagnetic energy is wirelessly transmitted from off-vehicle inductive coil 16 to on-vehicle inductive coil 18 within energy coupling arrangement 28. It is desired that the on- and off-vehicle inductive coils each have an operating temperature range from −30 degrees to +50 degrees Celsius.

Power transmitter 14 is in electrical communication with a fixed power source 26 and off-vehicle inductive coil 16. As such, power transmitter 14 and fixed power source 26 form a ground-based wireless power transmitter subsystem. Power source 26 is disposed external to electrical charging system 10 and vehicle 13. Preferably, power transmitter 14 is hardwired with power source 26 so as to eliminate handling of high voltage power cables electrically connecting power source 26 and power transmitter 14 by a human operator 32 so as to increase the safety of operator 32 and provide further convenience for operator 32 in the operation of electrical charging system 10. For example, as best shown in FIG. 3, operator 32 may be the driver of vehicle 13. Alternatively, the human operator may be any person that has access to electrical charging system 10. Power transmitter 14 is in electrical communication with off-vehicle inductive coil 16 through electrical wire cables 34 that carry an electrical output of power transmitter 14. When power transmitter 14 is electrically connected with power source 26, power transmitter 14 is configured to supply energy used by electrical charging system 10 to form electrical current that is provided to electrically charge energy storage device 12.

Off-vehicle inductive coil 16 is in wireless communication with on-vehicle inductive coil 18 in energy coupling arrangement 28 in that on-vehicle inductive coil 18 wirelessly receives, collects, or couples at least a portion of the energy transmitted by off-vehicle inductive coil 16 from energy provided by power transmitter 14 via fixed power source 26. Electromagnetic energy is wirelessly communicated, or transmitted from off-vehicle inductive coil 16 to on-vehicle inductive coil 18. Alternatively, the inductive coils of the energy coupling arrangement may wirelessly communicate by wireless inductive energy communication or wireless electrical communication. Another form of electrical wireless communication may be capacitive coupling. Electrical signal shaping device 20 advantageously electrically shapes communicated electromagnetic energy received and captured by on-vehicle inductive coil 18 to produce electrical current in a form useable by energy storage device 12. The produced electrical current is electrically transmitted through electrical signal shaping device 20 to electrically charge energy storage device 12. In some electrical applications, this electrical current is in a form that is useable by a charger prior to the battery being electrically charged.

Alignment means 22 is disposed external to vehicle 13 on ground surface 27, as best illustrated in FIG. 3. Alignment means 22 is a tire block, or wheel chock 37 that is configured for physical engagement, or contact with at least one of the tires 38*a*-*d* of vehicle 13. Wheel chock 37 may be commercially purchased or molded by an injection molding machine as is known in the molding art. Wheel chock 37 is positioned on ground surface 27 and may be secured to ground surface 27 using bolts or other type fasteners. As best shown in FIGS. 3 and 4, wheel chock 37 is engaged with right front tire 38*b*. Alternatively, the wheel chock may be strategically positioned in a manner along the ground surface so that any tire on the vehicle could be appropriately engaged such that the inductive coils wirelessly communicate electromagnetic energy therebetween. The placement of wheel chock 37 ensures vehicle 13 is positioned relative to off-vehicle inductive coil 16 of energy coupling arrangement 28 such that the on-vehicle inductive coil 18 receives the electromagnetic energy wirelessly transmitted from off-vehicle inductive coil 16. On-vehicle inductive coil 18 is fixedly attached to vehicle 13, preferably on an underside portion 39 of vehicle 13, so that an extended surface of on-vehicle inductive coil faces towards ground surface 27. In one type of mounting arrangement on the vehicle, the on-vehicle inductive coil may be mounted to a bracket or component frame (not shown) being attached to the vehicle's frame using a fasteners such as bolts or strap ties and the like. Easy access to the on-vehicle inductive coil without other vehicle components being underlying the on-vehicle inductive coil may allow the on-vehicle inductive coil to be more easily serviced. For example, as best illustrated in FIG. 2, on-vehicle inductive coil 18 is mounted at the rear of vehicle 13. Alternatively, the on-vehicle inductive coil may be mounted anywhere along the underside of the vehicle. Still yet alternatively, the on-vehicle inductive coil may be mounted anywhere on the vehicle so that the on-vehicle inductive coil effectively receives energy supplied and transmitted by the off-vehicle inductive coil when sufficiently proximately spaced one-to-another so that electromagnetic energy communicated therebetween. Using the secured wheel chock 37, then, allows operator 32 of vehicle 13 to repeatedly position vehicle 13 so that so that at least a respective portion of inductive coils 16, 18 are axially aligned along axis B when tire 38*b* of vehicle 13 engages against a strategically positioned wheel chock 37. Preferably, wheel chock 37 is strategically positioned so that a majority portion of on-vehicle inductive coil 18 overlies off-vehicle inductive coil 16 when tire 38*b* engages wheel chock 37, as best illustrated in FIG. 3. Furthermore, wheel chock 37 is positioned on ground surface 27 at a location so that when at least one of the tires 38*a*-*d* of vehicle 13 is positioned and communicates with wheel chock 37 by engaging wheel chock 37, the on-vehicle inductive coil 18 is also positioned relative to off-vehicle inductive coil 16 so that electromagnetic energy is effectively communicated therebetween from off-vehicle inductive coil 16 to on-vehicle inductive coil 18.

Alternatively, the alignment means may be an automotive wheel stop or at least one tire indention device. Still alternatively the wheel chock may have a weight that is sufficient to be engaged by at least one tire of the vehicle and not further move so that wireless communication between the inductive coils occurs. Preferably, wheel chock 37 is securely positioned on ground surface 27 at a location such that when engaged by tire 38*b* of vehicle 13 to ensure that at least a portion of on-vehicle inductive coil 18 overlies at least a portion of off-vehicle inductive coil 16 along an axis B, as best illustrated in FIG. 3. Axis B is transverse to ground surface 27 and axis A. Generally, the alignment of at least a portion of one inductive coil 18 overlying the other inductive coil 16 along axis B ensures that electromagnetic energy is wirelessly communicated between inductive coils 16, 18. Even more preferably, wheel chock 37 is positioned so that a majority portion of on-vehicle inductive coil 18 axially overlies off-vehicle inductive coil 16 along axis B. Additionally, when vehicle 13 communicates, or engages with wheel chock 37, a sensory response is produced as a result of vehicle 13 communicating with wheel chock 37. At least one sense organ of operator 32 disposed in vehicle 13 senses this sensory input, such that when the at least one sense organ senses the sensory input, at least a portion of on-vehicle inductive coil 18 of energy coupling arrangement 28 overlies off-vehicle inductive coil 16 of energy coupling arrangement 28. The human sense organs are generally recognized as sight by the human eye, smell by the human nose, taste by the human mouth, touch by the human skin, and hearing by the human ear. In relation to the wheel chock, the skin of the driver feels the touch of the 'bump' from the tire of the vehicle engaging the wheel chock which is an indication to the driver of the vehicle to stop movement of the vehicle.

Alternatively, the driver may also hear an engaging sound with the human ear when the tire of the vehicle engages the wheel chock. Alternatively, any alignment means that allows the on-vehicle inductive coil to overlie at least a portion of the off-vehicle inductive coil so that electromagnetic energy is wirelessly communicate therebetween falls within the spirit and scope of the invention. When inductive coils 16, 18, are in general alignment along axis external facing surfaces of inductive coils 16, 18 separated by a distance d, as best illustrated in FIG. 3. The axial space that spans distance d is an air gap. In one embodiment distance d may be a 15 to 20 centimeter distance in which a 3.3 kW signal out the power transmitter may be effectively transferred. A vehicle alignment member may also be advantageously used by operator 32 to further laterally align the left/right spacing of vehicle 13 when aligning inductive coils 16, 18. For example, one such aligning member is a tennis ball hung from a rope from a ceiling in a home garage or office parking structure and strategically positioned so that when a front end of vehicle 13 engages the tennis ball, operator 32 knows inductive coils 16, 18 are at least partially in alignment along axis B one-to-another.

Referring now to FIG. 4, a topical view of vehicle 13 shows further circuit elements of electrical signal shaping device 20 in block diagram form. Electrical signal shaping device 20 is adapted to electrically shape at least a portion of the energy received by on-vehicle inductive coil 18 and electrically transmit this electrically-shaped energy to electrically charge energy storage device 12. Electrical signal shaping device 20 includes controller/rectifier block 40 that includes a controller and a rectifier, a ballast resistor 42, a wireless voltmeter 44, an inverter 46, and a transfer switch 48. An electrical output 52 of on-vehicle inductive coil 18 is electrically received by controller/rectifier block 40. An electrical output 54 of controller/rectifier block 40 is electrically received by inverter 46. An electrical output 58 of inverter 46 is electrically received by transfer switch 48. An electrical output 61 of transfer switch 48 is received by charger 24. An electrical output 68 of charger 24 is electrically received by battery 12. The controller portion of the controller/rectifier block 40 may be a microcomputer or a microprocessor as is known in the electrical arts. The controller portion of the controller/rectifier block 40 has wireless data transmission 62 with power transmitter 14 and receives wireless data transmission 64 from power transmitter 14. Data is also electrically wirelessly communicated 66 from wireless voltmeter 44 to the controller portion of controller/rectifier. The controller portion of controller/rectifier block 40 also electrically communicates data on a vehicle data communication bus 60 with other vehicular electrical devices. Data communication monitored by the controller portion of the controller/rectifier block 40 centers around the present electrical charge condition, or state of battery 12. Alternatively, the inverter may not be utilized. If an inverter is not used in the electrical signal shaping device of the electrical charging system the overall system power efficiency of the electrical charging system is desirably increased, the vehicle weight is desirably reduced, and the parts complexity of the electrical charging system is also desirably reduced improving the reliability of the electrical charging system.

Charger 24 is disposed in vehicle 13 external to electrical charging system 10 being associated with the vehicular electronics similar to battery 12 previously described herein. These electrical devices may be disposed on printed circuit boards housed in a single unit or in multiple units as required by the application of use. Alternatively, the controller/rectifier block of the electrical signal shaping device may be disposed as separate, distinct controller and rectifier functional blocks within the electrical charging system. The controller may also operate an algorithm that presents input to the controller that receives information from the vehicle on the data communication bus on the present state of the electrical charge of the battery for determining a new rate of electrical charge that will be allowed by the battery. The newly input information then will determine a new rate of electrical charge allowed for the battery. One such algorithm is described in U.S. Pat. No. 7,800,344 entitled "METHOD OF DETERMINING THE ENERGY CAPACITY OF A BATTERY," which is incorporated by reference in its entirety herein.

Power transmitter 14 receives electrical energy from power source 26, amplifies the received energy, and supplies the amplified received energy to off-vehicle inductive coil 16. Off-vehicle inductive coil 16 wirelessly electromagnetically transmits or propagates at least a portion of the amplified energy to on-vehicle inductive coil 18. On-vehicle inductive coil 18 receives at least a portion of the electromagnetic energy transmitted from off-vehicle inductive coil 16. On-vehicle inductive coil 18 transmits this received energy to electrical signal shaping device 20 that electrically shapes and electrically transmits this electrically-shaped energy to subsequently electrically charge battery 12 on vehicle 13. Using the invertor advantageously allows the simplest integration of the electrical charging system into existing vehicles that include vehicle charger. The vehicle charger is readily able to accept an output of the invertor without additional modification or cost to the overall electrical charging system. One undesired disadvantage of using an inverter in the electrical charging system may be lower system power efficiency of the overall electrical charging system due to an extra electrical component in the electrical charging system that may be subject to system power efficiency losses.

Figure 5:
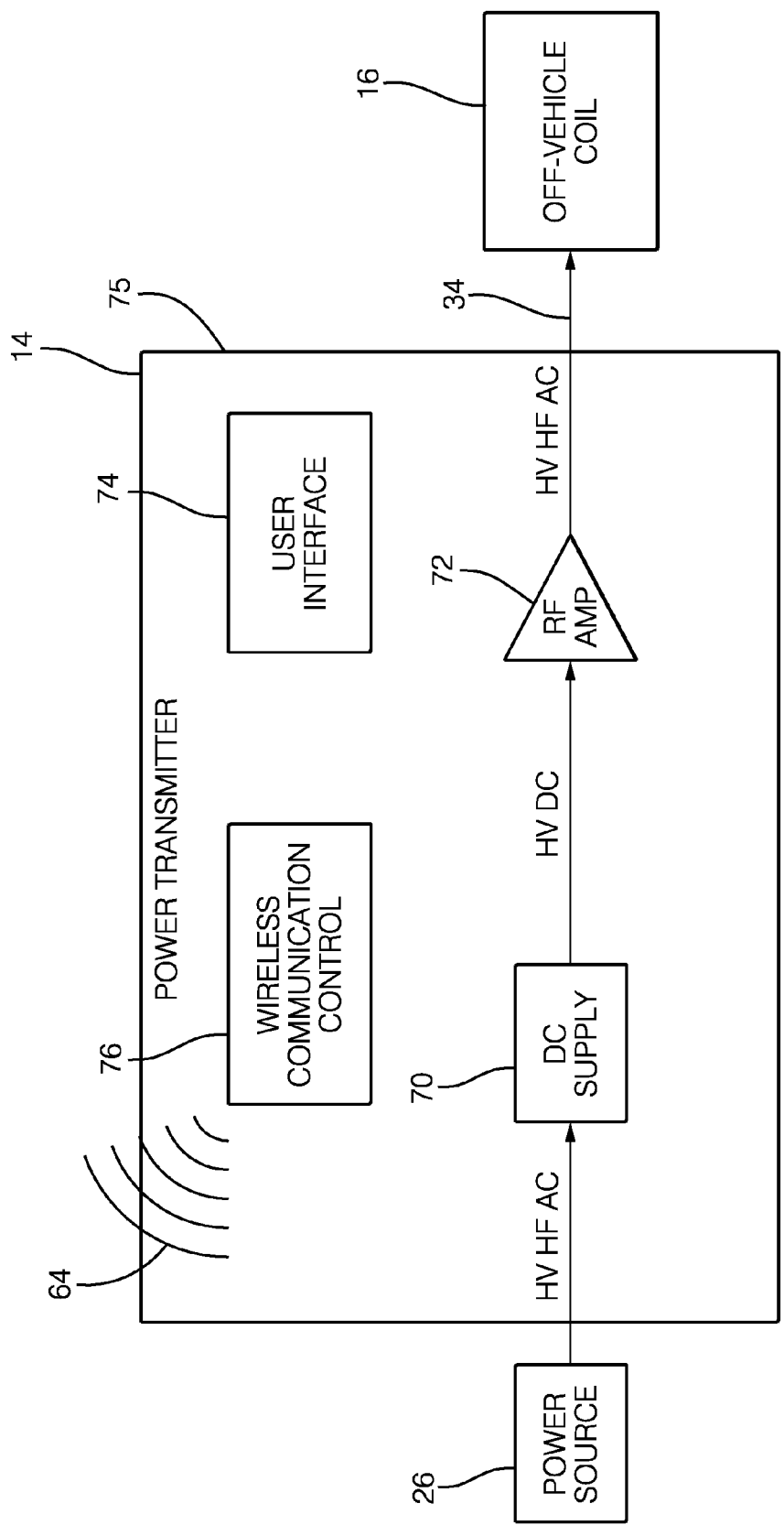
FIG. 5 shows a block diagram of a single power transmitter of the electrical charging system of FIG. 2, and details thereof.
Figure 5:
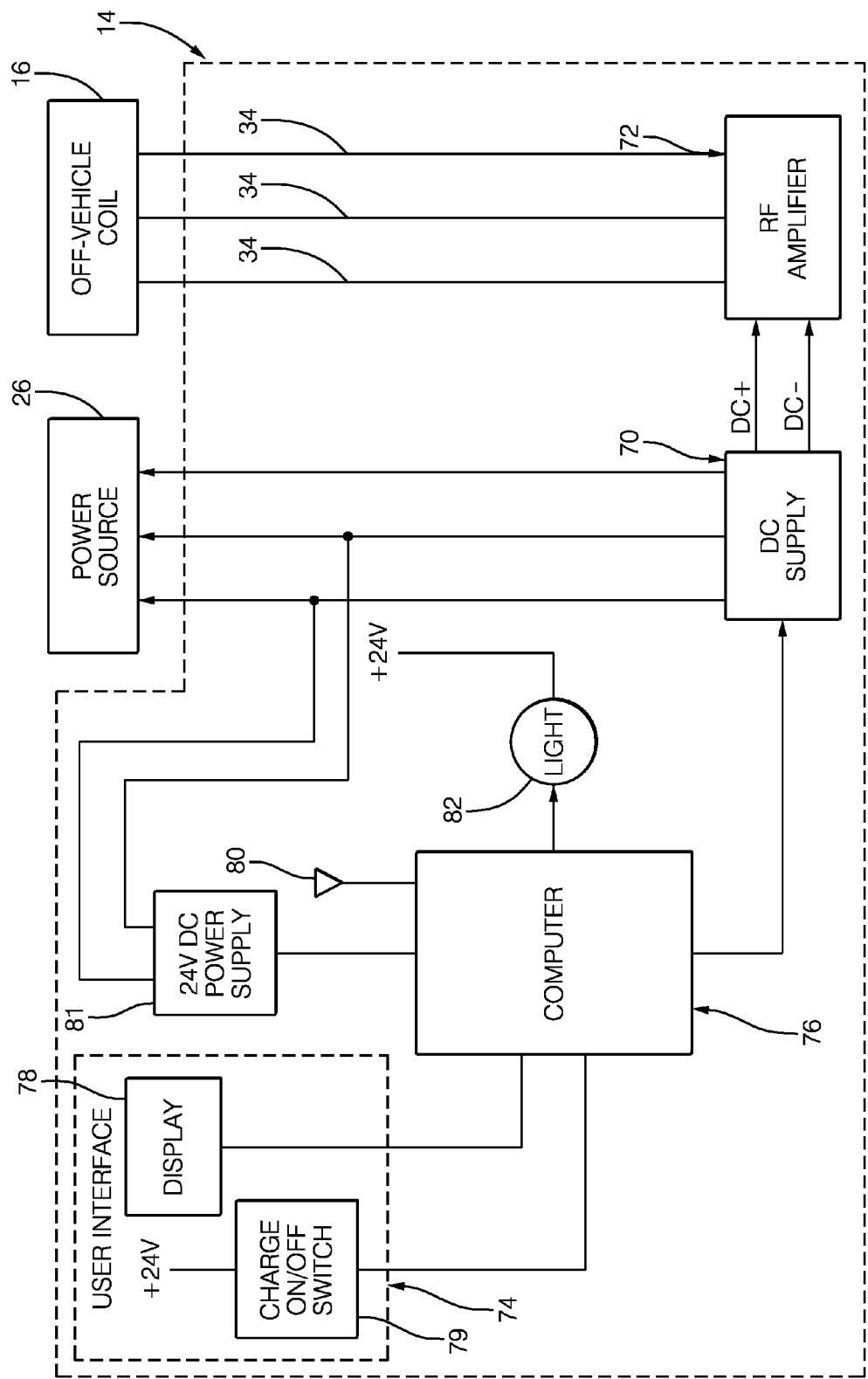

Referring to FIGS. 4-5, the energy supplied by fixed power source 26 is received by power transmitter 14 that produces a DC voltage via DC power supply 70 that is modulated and provided electrical gain by amplifier 72 to become a high frequency AC voltage that is output from amplifier 72 and further output from power transmitter 14 on cables 34. The high frequency AC voltage output from amplifier 72 may be in range from 10 kHz to 450 kHz. More preferably, this range is from 90 kHz to 170 kHz. These high frequency approaches allow for the overall system efficiencies to be increased that also allow for greater misalignment between inductive coils providing a greater operational flexibility system in contrast to an electrical charging system that operates at frequencies lower than 10 kHz. This further allows for greater operator convenience for the user of the electrical charging system. The higher frequency also allows for the inductive coils to be constructed having less mass, less size than would be required if lower frequencies where utilized. Less mass may advantageously allow the vehicle to travel a longer distance than may otherwise be able for a given amount of electronic charge of the battery. This may allow further flexibility in locating the inductive coils on the vehicle and on the ground surface when initially setting up the electrical charging system. Also allows for greater distance d clearance as, best illustrated in FIG. 3. With a higher system power efficiency, a lower energy cost may desired by the user to electrically charge the battery. The high frequency, high AC voltage is electrically transmitted to off-vehicle inductive coil 16 which wirelessly transmits at least a portion of this energy to, and received by on-vehicle inductive coil 18 and further electrically transmits this portion along signal path 52 to controller/rectifier block 40. The rectifier portion of the controller/rectifier block 40 electrically rectifies this voltage to produce a corresponding direct current ($I_{DC}$). This $I_{DC}$ current is electrically transmitted along signal path 54 to inverter 46 which inverts the corresponding DC current to produce a 50-60 Hz electrical current useful to electrically charge battery 12. This 50-60 Hz electrical current is transmitted along signal path 58 to transfer switch 48.

Power source 26 includes a metal enclosure, or housing that surrounds DC power supply 70, amplifier 72, user interface 74, and wireless communication control 76. User interface 74 may include LEDs, audible alarms, and a control panel. The LEDs and audible alarms may indicate fault or status conditions to the human operator of the system. In other embodiments, fault conditions and/or audible alarms may sound off if the inductive coils are not sufficiently aligned as described herein so that the electrical charging system may electrically charge the battery. The gist of these features includes getting the attention of the human operator that the battery is not being charged when it should be and describing to the human operator where the fault lies so the problem may be fixed before the human operator leaves the local area of the electrical charging system and the vehicle. If these features where not present, the human operator may leave the local area and come back to the vehicle at a later time to find out that the battery had not been electrically charged. This would be an undesired situation as the human operator may not be able to operate the vehicle over a desired distance that has less than a full level of electrical charge.

In one embodiment, the power transmitter includes a fan for cooling the electronics contained therein. Cables 34 may further be contained within a liquid-tight, flexible metal conduit for high voltage, high frequency signal carried on cables 34. The power transmitter may further include a head sink to wick heat away from the amplifier on communication control electronics. The power transmitter electrical connection to the power source may be contained in a flexible metal conduit. The power transmitter may include provisions to attach the power transmitter to a mounting bracket that can further be attached to a wall.

Transfer switch 48 is selectably controlled to a first or a second position by the controller portion of controller/rectifier block 40 along control signal path 56. Control of transfer switch 48 by the controller portion of the controller/rectifier block 40 is one approach that allows electrical charging system 10 to control a rate of electrical charge provided to battery 12. When transfer switch 48 is set to a first position, the 50-60 Hz electrical current is carried on electrical output 58 of inverter 46 is received by charger 24 along signal path 61. When transfer switch 48 is set to a second position by the controller portion of the controller/rectifier block 40, the electrical output of inverter 46 is not received by charger 24 along signal path 61. Transfer switch 48 is in electrical communication with a charger 24 that regulates and controls the voltage that is useful to electrically charge battery 12. Charger 24 is used by electrical systems of vehicle 13 to allow independent vehicular control of battery charging independent of electrical charging system 10. Thus, charger 24 may further modify or manage the electrical charging of battery 12 from electrical current received from electrical charging system 10 as controlled by electronics disposed in vehicle 13. Alternatively, the vehicle charger may not be employed.

The controller portion of controller/rectifier block 40 communicates with electrical components disposed on vehicle 13 through a vehicle data communication bus 60. Alternatively, the transfer switch may be controlled by another electrical device in the vehicle through the vehicle data communication bus communicating with controller/rectifier block 40. Vehicle data communication bus 60 may communicate vehicle status information to electrical charging system 10. Wireless voltmeter 44 measures the magnitude of the voltage and/or electrical current along signal path 54 of controller/rectifier block 40. This voltage information is wirelessly communicated with a receiver portion of the controller/rectifier block 40 in electrical charging system 10. Knowing the on-board vehicle voltage information allows for the variable adjustment of off-vehicle inductive coil 16 by electrical charging system 10 to optimize electrical operation of electrical charging system 10. The energy flow out of the RF amplifier is adjusted based on the voltage. Ballast resistor 42 is used to minimize the magnitude of the voltage along signal path 54 during electrical start-up of electrical charging system 10. Alternatively, the ballast resistor may not be used in the electrical charging system. In one embodiment, the electrical current available to charge the battery along signal path 61 may be in a range of 10-20 amps DC. The electrically-shaped energy electrically transmitted in to electrical signal shaping device 20 has a first frequency along signal path 52 and a second frequency along signal path 61 electrically output from transfer switch 48 transmitted to charger 24 and subsequently to battery 12. The first frequency is greater than the second frequency. Preferably, the second frequency is at least 45 Hz and the first frequency is disposed in a range from 20 kHz to 200 kHz in contrast to the frequency of an electrical output signal on cables 34 from off-vehicle inductive coil 16.

Referring to FIGS. 5 and 5A, power transmitter 14 includes a housing 75 that encloses a plurality of electrical components (not shown) in an integral package. The housing may be constructed of any solid material such as metal or plastic where the metal material may be stamped into form or the plastic material molded. The electrical components form a respective first electrical portion, a second electrical portion, a third electrical portion, and a fourth electrical portion within housing 75. The portions may be formed on one or more printed circuit boards disposed within housing 75. Power transmitter 14 has an electrical output carried on cables 34 in electrical communication with off-vehicle inductive coil 16. The first electrical portion is a DC power supply 70. The second electrical portion is amplifier 72 in electrical communication with DC power supply 70.

The third electrical portion is a user interface 74. User interface 74 provides operating condition information of electrical charging system 10 to operator 32. Preferably, user interface 74 is very useful to alert the human operator of an issue with that would keep the electrical charging system from electrically charging battery. Additionally, it is also advantageous to do so after the human operator, such a driver of the vehicle, exits the vehicle is still in the local area of the electrical charging system. Thus, it is important to get the driver's attention if some condition prevents the electrical charging system from charging the battery. It is also important, the once the driver's attention is focused on the fault condition, that the electrical charging system educate and inform the driver on how to fix the faulty condition so the electrical charging system is allowed to electrically charge the energy storage device. If the user interface did not operate to alert the driver to electrical charging system conditions that prevent the battery from being electrically charged, the battery may undesirably remain in an uncharged state, when the human operator otherwise expected the battery to be a fully charged electrical state. For example, if the vehicle is not properly aligned so the second inductive coil receives energy from the first inductive coil, or if the vehicle's transmission is not disposed in the 'park' position, these types of conditions may prevent the battery from being electrically charged.

User interface has a visual element 78 seen by eyes of operator 32. Visual element 78 is preferably an LCD display. LCD 78 includes four (4) alphanumeric lines that each display different performance metrics of electrical charging system 10. A first alphanumeric line displays information about the general operating conditions of electrical charging system 10. A second alphanumeric line displays the output voltage of rectifier portion of controller/rectifier block 40 and the output voltage and power output delivered from the controller/rectifier block 40 to the remaining portion of the electrical charging system and the vehicle. A third alphanumeric line displays shows a DC voltage supplied by DC power supply 70 to amplifier 72 of power transmitter 14. A fourth alpha numeric line displays the system power efficiency. Alternatively, the LCD display may have other arrangements for display information, for instance, error messages when the electrical charging system experiences a fault condition that is useful to the human operator for the operation of the electrical charging system. Power transmitter 14 also contains a multicolored light 82. Light 82 may be operated to alter between different colors of light to indicate various operational status conditions of electrical charging system 10. For example, the light may change from green to yellow to red in which may be an undesired electrical charging system fault that keeps electrical charging system 10 from electrically charging energy storage device 12. A red colored light due to a fault may alternatively be displayed on the LCD display.

Alternatively, at least one audible element may be heard by ears of human operator. For example, if the vehicle was not aligned so that the inductive coils are suitably proximate to one another so as to transmit/receive the electromagnetic energy, an audible noise may be generated through an audio output, such as to a speaker, that provides an indication to the human operator that the electrical charging system is not electrically charging the energy storage device. This would further get the human operator's attention before leaving the local area of the vehicle and the electrical charging system to correct the problem. In yet another embodiment, the user interface includes at least one visual element and at least one audible element. User interface 74 comprises a provision 79 that allows operator 32 of electrical charging system 10 to command electrical charging system 10 to perform at least one operation. Provision 79 is an ON/OFF push button to turn power transmitter 14 electrically ON so power transmitter 14 is energized to produce energy to transmit to off-vehicle inductive coil 16 or electrically OFF in which power transmitter is powered down and energy is not transmitted to off-vehicle inductive coil 16. User interface 74 includes an LCD display. Alternatively, the user interface may include any number of LEDs, lights, a LED display, and at least one push button.

The fourth electrical portion is a wireless communication control section 76 that wirelessly electrically communicates through antenna 80 with a portion of electrical charging system 10 disposed on vehicle 13. Fourth portion 76 is a computer or microprocessor as is known in the art. Power transmitter 14 analyzes the received data from the controller portion of controller/rectifier block 40 via wireless communication control 76 and adjusts DC power supply 70 to ensure that an output of the rectifier portion of controller/rectifier block 40 is within a range dependent on the electrical application of use for the electrical charging system 10. Control 76 may also be used as a receiver/transmitter to communicate with charger 24 and other electronic devices of vehicle 13 through the vehicle data communication bus 60 to ensure optimal electrical charging of battery 12. The controller portion of the controller/rectifier block 40 may also receive/transmit data to charger 24 through vehicle data communication bus 60. An electrical signal carried on cables 34 that is output from power transmitter 14 has a frequency of greater than 60 Hz and a power output of greater than 900 watts electrically transmitted to off-vehicle inductive coil 16. In one embodiment the power transmitter transmits 3.3 kilowatts (kW). The electrical signal carried on cables 34 has a frequency value that is disposed in a range from 15 kHz to 450 kHz. In another embodiment, 3.3 kW output out from the power transmitter may electrically charge a battery having a low level of electrical charge in about 4 hours of time. In another embodiment, a battery electrically charged to a full level of electrical charge may allow a vehicle containing the battery to travel up to a maximum of 64.7 km (40 miles).

Electrical charging system 10 is formed to have a system power efficiency that is the same as, or is greater than 75%. Preferably, the 75% or greater system power efficiency is a desired level so that the electrical charging system is cost effective to operate for the human operator. Having less than 75% may be undesired as this may not be cost effective for the human operator to operate the electrical charging system. Preferably, having a number greater than 75% may be even more desirable as the cost of operating the electrical charging system becomes even less for the human operator.

Children and/or pets may be in close proximate to the off-vehicle inductive coil during electrical charging of the energy storage device. A human occupant may occupy the vehicle during the electrical charging of the energy storage device. The electrical charging system may adjust output voltage from the power transmitter based upon different energy storage device battery voltages used by different vehicle manufacturers. Sending data across the data communication link is required before the electrical charging system may initiate electrical charging of the energy storage device. The RF amplifier of the power transmitter will not be activated until electrical charging of the energy storage device is requested by the vehicle's electronic devices. System power efficiency may remain the same as or greater than 75% efficient as the electrical charge current progressively decreases during the electrical charge cycle.

Figure 6:
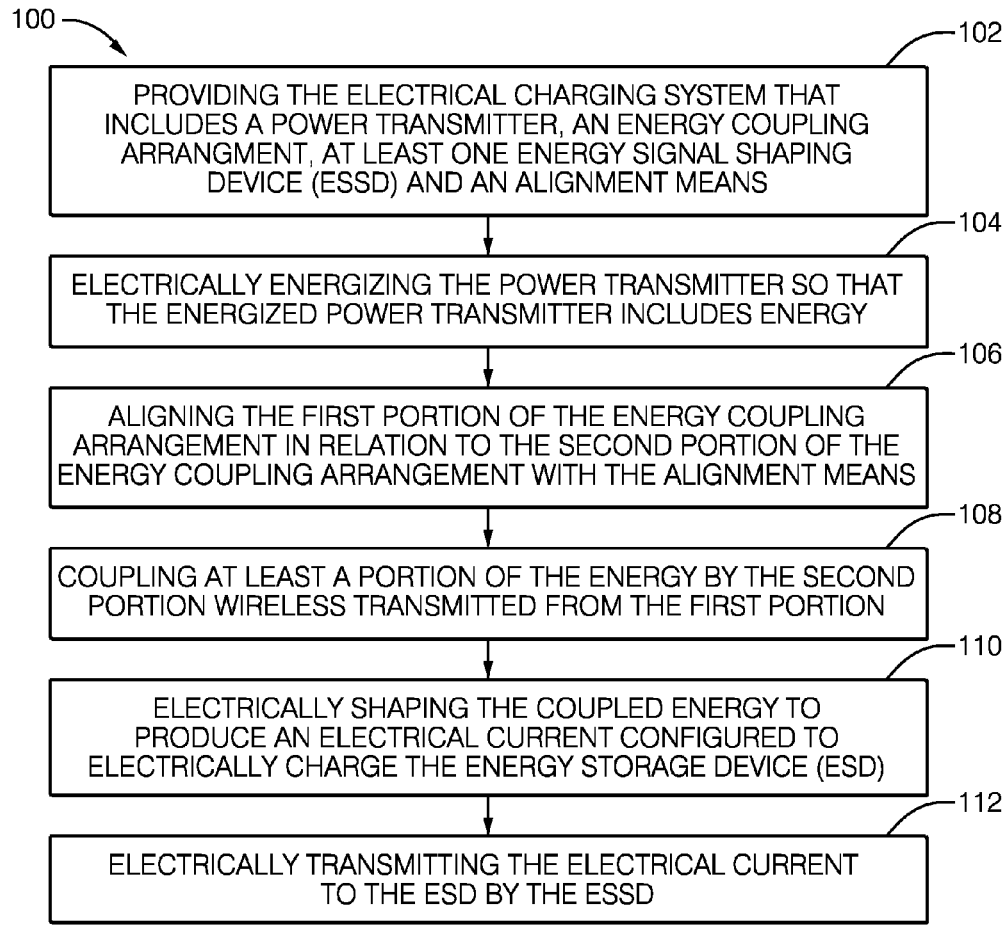
FIG. 6 shows a method to operate the electrical charging system of FIG. 2 that uses an alignment means of the electrical charging system to ensure repeatable energy transmission of electromagnetic energy in an energy coupling arrangement.

Reference numerals 62, 64, and 66 represent wireless electrical signal energy paths to transmit electronic data between various electrical components in electrical charging system 10. Wireless voltmeter 44 measures voltage along signal path 54 of electrical signal shaping device 20 and wirelessly transmits this data measurement information to controller/rectifier block 40. Wireless electrical signal energy 62 is wirelessly transmitted from controller/rectifier block 40 to power transmitter 14. Power transmitter 14 actively receives signal energy 62. Power transmitter 14 also wireless transmits data information to controller/rectifier block 40. The purpose of the wireless energy transmission of signal energy along signal paths 62, 64, 66 is to optimize the operational performance of electrical charging system 10 to electrically charge energy storage device 12. More particularly, the electrical charging system is configured to optimize real-time electrical charging system operation and ensure the system power efficiency is, and remains greater than 75%. The controller portion of controller/rectifier block 40 may measure the electrical current output on signal path 54. The controller portion of controller/rectifier may also mathematically generate power readings along signal path 54, having the electrical current data and the voltage data from wireless voltmeter 44. Alternatively, the power may be also be actually measured. The electrical voltage, electrical current, or power data may be sent to power transmitter 14 on wireless signal path 62. Power transmitter 14 receives this data can then adjust its output signal on cables 34 to maintain a power system efficiency of electrical charging system 10 at greater than 75% while electrical charging system is electrically charging energy storage device 12. Power transmitter 14 requests controller/rectifier block 40 for voltage, current, or power data along wireless signal path 64. In some embodiments, power transmitter 14 may request only one type of data, or any combination of data as is required by power transmitter 14. Alternatively, the controller/rectifier may periodically send any or all of this data to the power transmitter along with wireless data signal path.

electrical charging system 10 is not in use when power transmitter 14 is not in communication with power source 26. Electrical charging system 10 is also not in use when power transmitter 14 is in communication with power source 26 and the ON/OFF switch 79 on user interface 74 has not been activated by operator 32. When ON/OFF switch 79 is inactivated electrical charging system 10 is in an OFF state such that energy storage device 12 cannot be electrically charged by electrical charging system 10.

electrical charging system 10 is partially in use when electrical charging system 10 is in electrical communication with power source 26 and electrical charging system 10 is in an ON state, but inductive coils 16, 18 are spaced sufficiently far apart so the electromagnetic energy in not wirelessly transmitted/received therebetween. For example, it may not be necessary for inductive coils to at least partially overlie one another for electrical charging system 10 to electrically charge energy storage device 12. If inductive coils are sufficiently spaced part, either axially or laterally and the electrical charging system has a system power efficiency measured at 75% efficiency or greater by power transmitter 14, electrical charging system 10 will electrically charge energy storage device 12 if electrical charge is needed by energy storage device 12. Power transmitter 14 looks at power, voltage, and current carried on output, or cables 34 to determine whether electrical charging system 10 electrically charges energy storage device 12 and at what rate electrical charging system 10 electrically charges energy storage device 12.

electrical charging system 10 is in use when power transmitter 14 is in electrical communication with power source 26 and the inductive coils 16, 18 are spaced sufficiently close, such as axial distance d, so that electromagnetic energy transmitted/received between inductive coils 16, 18 occurs with an system power efficiency of at least 75% as measured by power transmitter 14, as best illustrated in FIG. 3. Referring to FIG. 6, electrical charging system 10 electrically charges battery 12 of vehicle 13 by method 100. One step 102 in method 100 is providing electrical charging system 10 which includes power transmitter 14, energy coupling arrangement 28, at least one electrical signal shaping device 20, and wheel chock 37, all of which is previously described herein. Another step 104 in method 100 is electrically energizing power transmitter 14 of electrical charging system 10 so that off-vehicle inductive coil 16 includes energy. A further step 106 in method 100 is aligning on-vehicle inductive coil 18 of energy coupling arrangement 28 in relation to off-vehicle inductive coil 16 when vehicle 13 communicates with wheel chock 37 such that on-vehicle inductive coil 18 is configured to receive the energy wirelessly transmitted from off-vehicle inductive coil 16. Another step 108 in method 100 is receiving at least a portion of the wirelessly transmitted energy by on-vehicle inductive coil 18 from off-vehicle inductive coil 16. A further step 110 in method 100 is electrically shaping the portion of the received energy through on-vehicle inductive coil 18 by electrical signal shaping device 20 to produce an electrical charging current configured to electrically charge energy storage device 12. Another step 112 in method 100 is electrically transmitting the electrical charging current to energy storage device 12 by electrical signal shaping device 20 to electrically charge energy storage device 12. Electrical charging system 10 may control electrical charging of energy storage device 12 by use of an algorithm as previously described herein or controlling the power output to the first inductive coil by the power transmitter, or the controller controlling the operation of the transfer switch. Another way of controlling the electrical charging of the energy storage device is for the user to activate ON/OFF switch 79 to turn the electrical charging system OFF to a non-powered state so that electrical signals carried on cables 34 do not occur.

Figure 7:
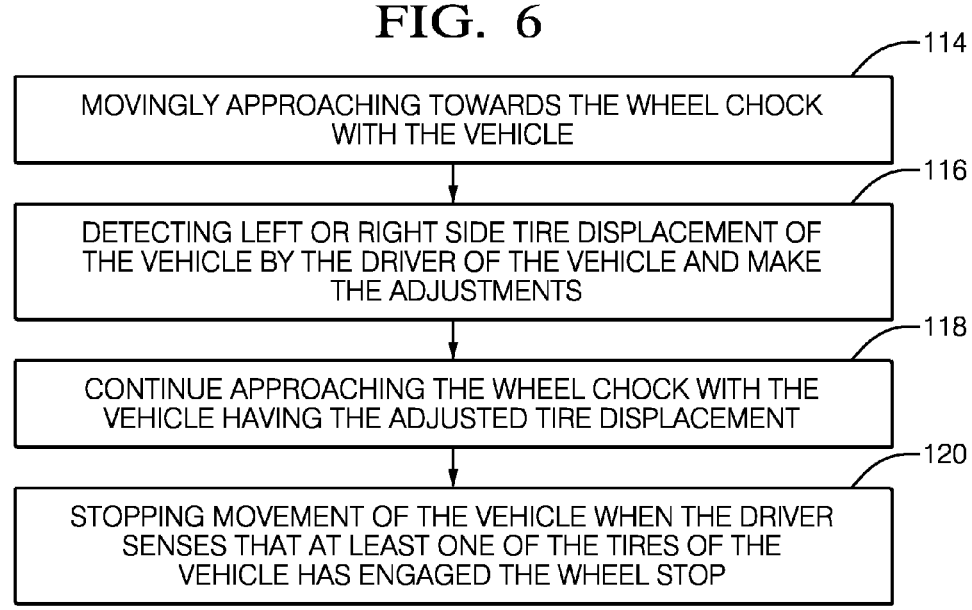
FIG. 7 shows further substeps of the method of FIG. 6 for positioning the vehicle so that the inductive coils are configured to wirelessly communicate one-to-another.

Referring to FIG. 7, the aligning step 106 of method 100 further includes the following substeps 114, 116, 118, 120 to further align vehicle 13 so that vehicle 13 may engage wheel chock 37. Using lateral vehicle alignment member may further assist operator 32 to position vehicle 13 in an efficient manner. As electrical charging system 10 is disposed in a fixed location, such as a home garage or a parking structure, vehicle 13 needs to movingly approach ground-based off-vehicle inductive coil 16 and wheel chock 37 so that the inductive coils 16, 18 may be configured to wirelessly transmit/receive energy therebetween. Thus, substep 114 of method 200 is movingly approaching, with vehicle 13, towards wheel chock 37. Substep 116 is detecting lateral left or right side tire displacement of vehicle 13 by operator 32 of vehicle 13 and make tire displacement adjustments to align on-vehicle inductive coil 18 with off-vehicle inductive coil 16. Substep 118 of method 200 is to continue approaching wheel chock 37 with vehicle 13 having the adjusted tire displacement, and substep 120 of method 200 is stopping movement of vehicle 13 when operator 32 senses with one of the human senses that at least one tire 38 of the vehicle has engaged at least one wheel chock 37.

Figure 8:
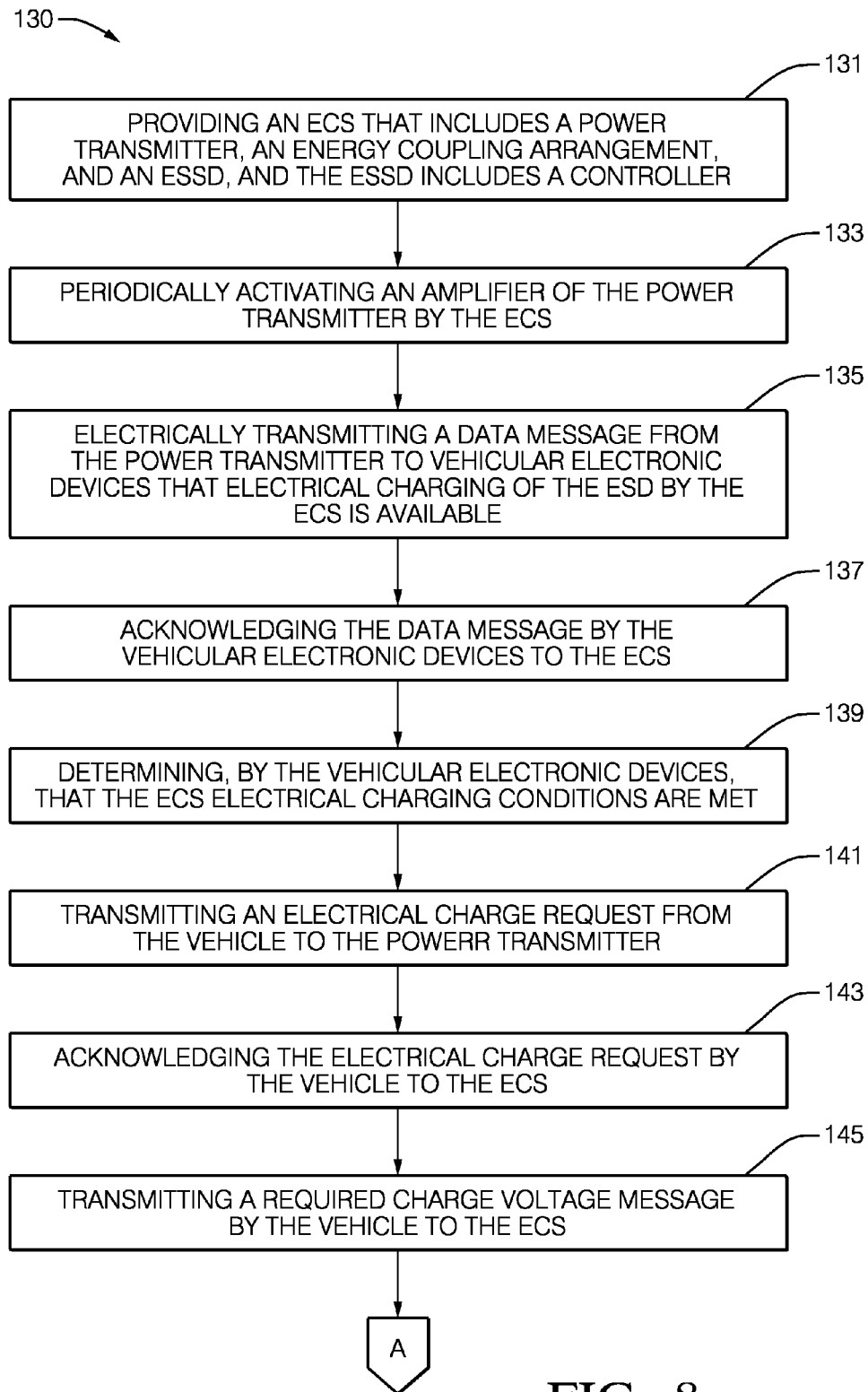
FIG. 8 shows another method to operate the electrical charging system of FIG. 2 based on data message transmission and acknowledgement.
Figure 9:
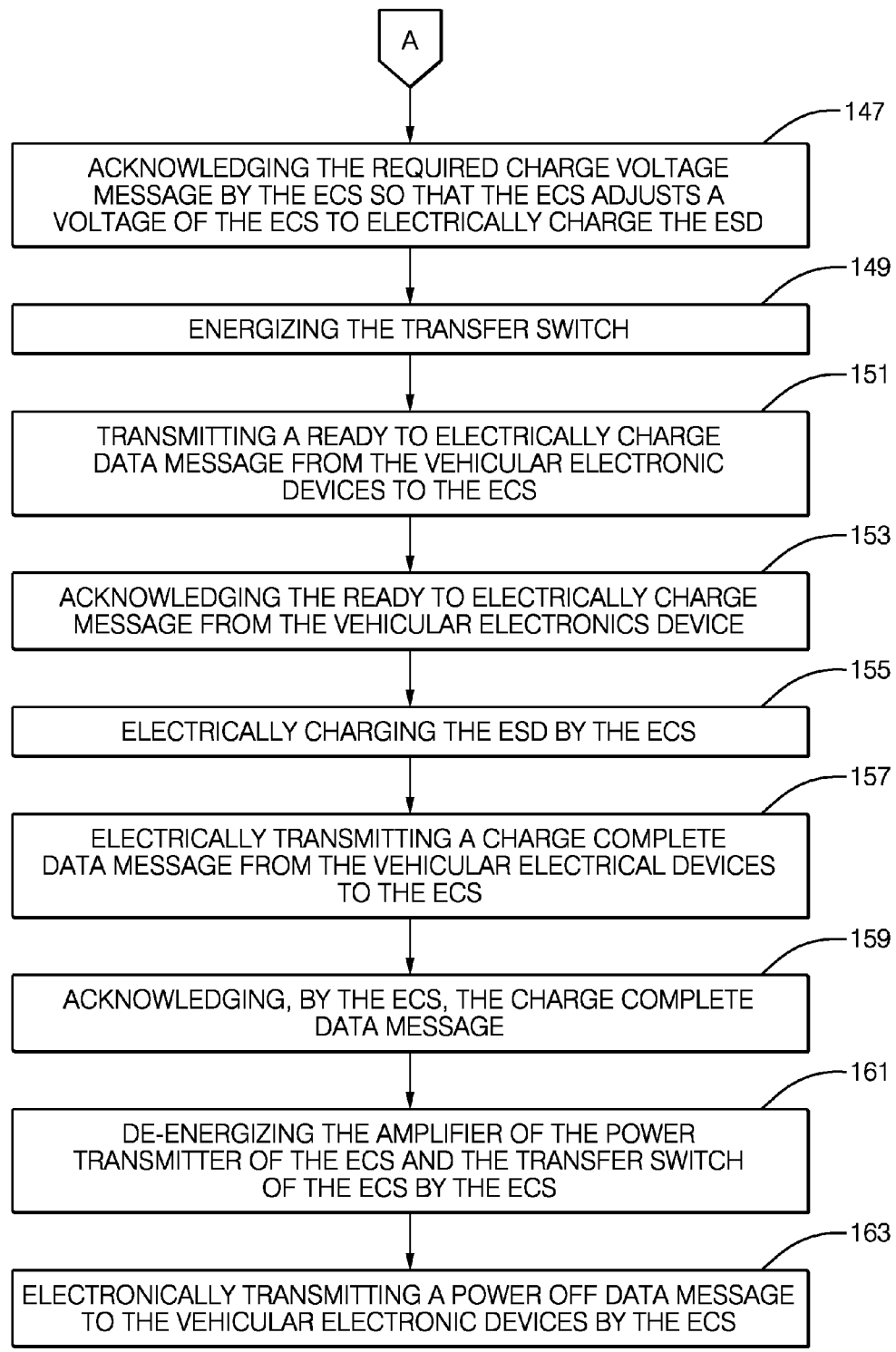
FIG. 9 shows additional steps of the method of FIG. 8.

Referring to FIGS. 8 and 9, yet another method to operate an energy storage device is presented.

A method 130 is presented to electrically charge an energy storage device in a vehicular electrical charging system. One step 131 in method 130 is providing the electrical charging system that includes a power transmitter, an energy coupling arrangement, at least one electrical signal shaping device that includes a controller and a transfer switch, and the energy coupling arrangement includes an off-vehicle inductive coil and an on-vehicle inductive coil, the off-vehicle inductive coil being in electrical communication with the power transmitter and the on-vehicle inductive coil being disposed on the vehicle, and the electrical signal shaping device being in electrical communication with the on-vehicle inductive coil. Another step 133 in method 130 is periodically activating an amplifier in the power transmitter by the electrical charging system to determine if the vehicle is in a distance range in which the off-vehicle inductive coil is effective to transmit energy to the on-vehicle inductive coil. A further step 135 in method 130 is electrically transmitting a data message from the power transmitter to the electrical signal shaping device that is further electrically transmitted to electronic devices in the vehicle to indicate to the electronic devices in the vehicle that electrical charging of the energy storage device by the electrical charging system is available. A further step 137 in method 130 is acknowledging the data message by the vehicular electronic devices to the electrical charging system. Another step 139 in method 130 is determining, by the vehicular electronic devices, that electrical charging system charging conditions to electrically charge the energy storage device are met. A further step 141 in method 130 is transmitting an electrical charge request from the vehicle to the power transmitter. Another step 143 in method 130 is acknowledging the electrical charge request by the vehicle to the electrical charging system. A further step 145 in method 130 is transmitting a required charge voltage message by the vehicle to the electrical charging system. Another step 147 in method 130 is acknowledging the required charge voltage message by the electrical charging system so that the electrical charging system adjusts a voltage of the electrical charging system to electrically charge the energy storage device. A further step 147 in method 130 is energizing the transfer switch. Alternatively, in other electrical charging system configurations that include only electrical charging system 10 may not require the transfer switch to be energized. Another step 149 in method 130 is transmitting a ready to electrically charge data message from the vehicular electronic devices to the electrical charging system. A further step 151 in method 130 is acknowledging the ready to electrically charge message by the electrical charging system to the vehicular electronic devices. Another step 155 is method 130 is electrically charging the energy storage device by the electrical charging system. Wireless signal paths 62, 64, and 66 transmit voltage, current, and/or power data, as previously described herein, that is useful in determining the reflected and received power measurements as described in method 200, more particularly steps 206 and 208. Temperature data measured from inductive coils (not shown) disposed adjacent on-board inductive coil 18 may also be sent along wireless signal path 62 to power transmitter 14. This data is useful for the monitoring temperature step 213 of method 200.

electrical charging system 10 includes other conditions be present to electrically charge battery 12. One condition that electrical charging system 10 needs to know is whether battery 12 even needs to be electrically charged. Another condition electrical charging system 10 needs to know is if the transmission of vehicle 13 is in the PARK position so that vehicle 13 that provides an indication to the electrical charging system that vehicle 13 is not in motion. A further condition the electrical charging system 10 needs to know is if an ignition key of vehicle 13 is in the OFF position along with the vehicle's audio and video electronic devices being de-energized. The electrical charging system may additionally need to know that no human operator of the vehicle is disposed within the vehicle cabin space before the electrical charging system will electrically charge the energy storage device. These above-mentioned conditions may be monitored by electrical charging system 10 over vehicle data communication bus 60. Alternatively, any combination of the abovementioned conditions may be used as conditions for the electrical charging system to operate to electrically charge the battery. Still yet alternatively, none of these aforementioned conditions need be present for the electrical charging system to operate to electrically charge the battery.

When the energy storage device has a full state of electrical charge, and method 130 further includes a step 157 of electrically transmitting a charge complete data massage from the vehicular electrical devices to electrical charging system 10. Another step 159 in method 130 is acknowledging, by the electrical charging system, the charge complete data message. A further step 161 in method 130 is de-energizing amplifier 72 of power transmitter 14 of electrical charging system 10 and transfer switch 48 of electrical charging system 10 by electrical charging system 10. Another step 163 in method 130 is electrically transmitting a power off data message to the vehicular electronic devices by electrical charging system 10.

Figure 10:
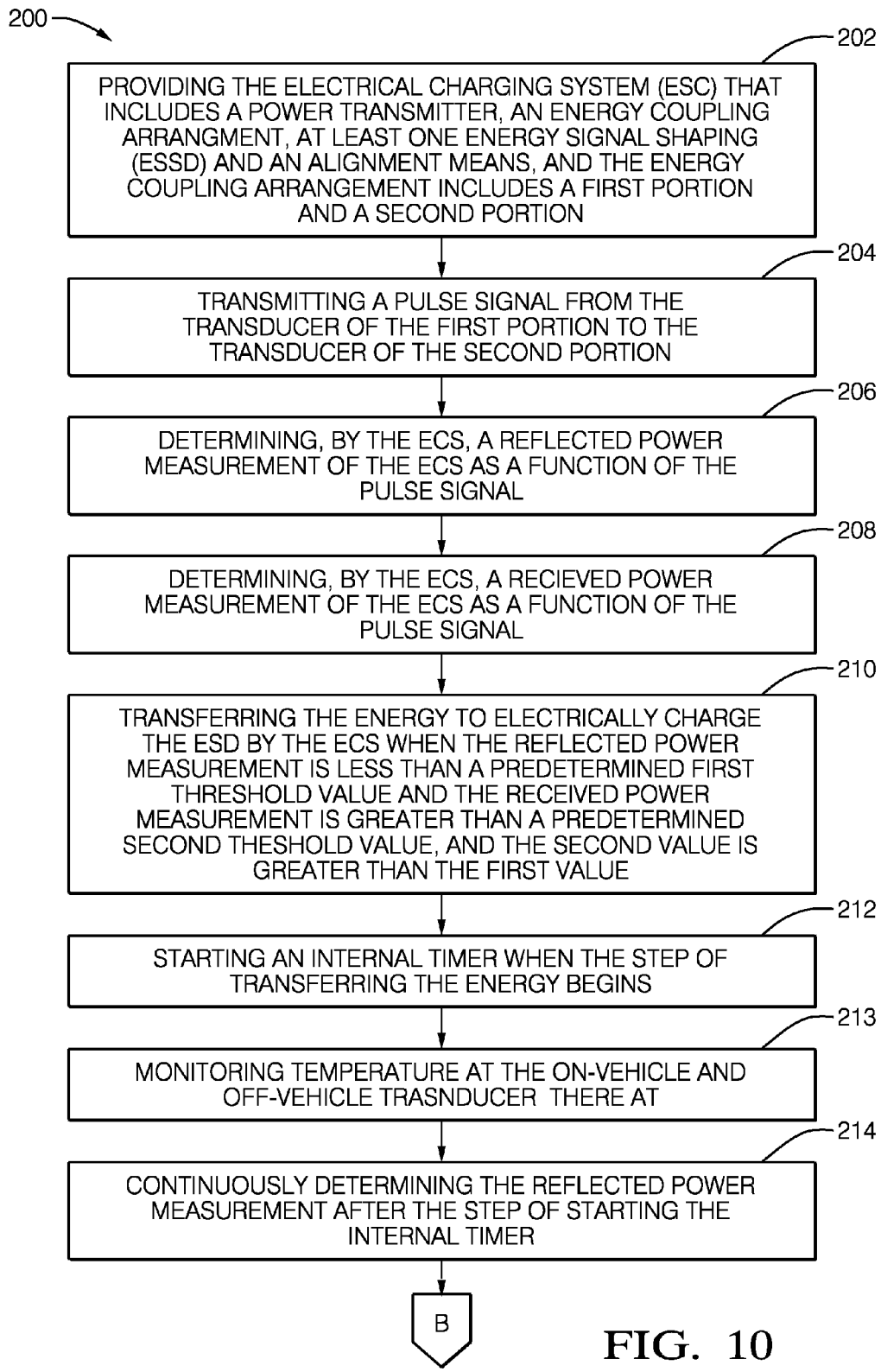
FIG. 10 shows a method to transmit energy through the electrical charging system of FIG. 2 using reflected and received power measurements.
Figure 11:
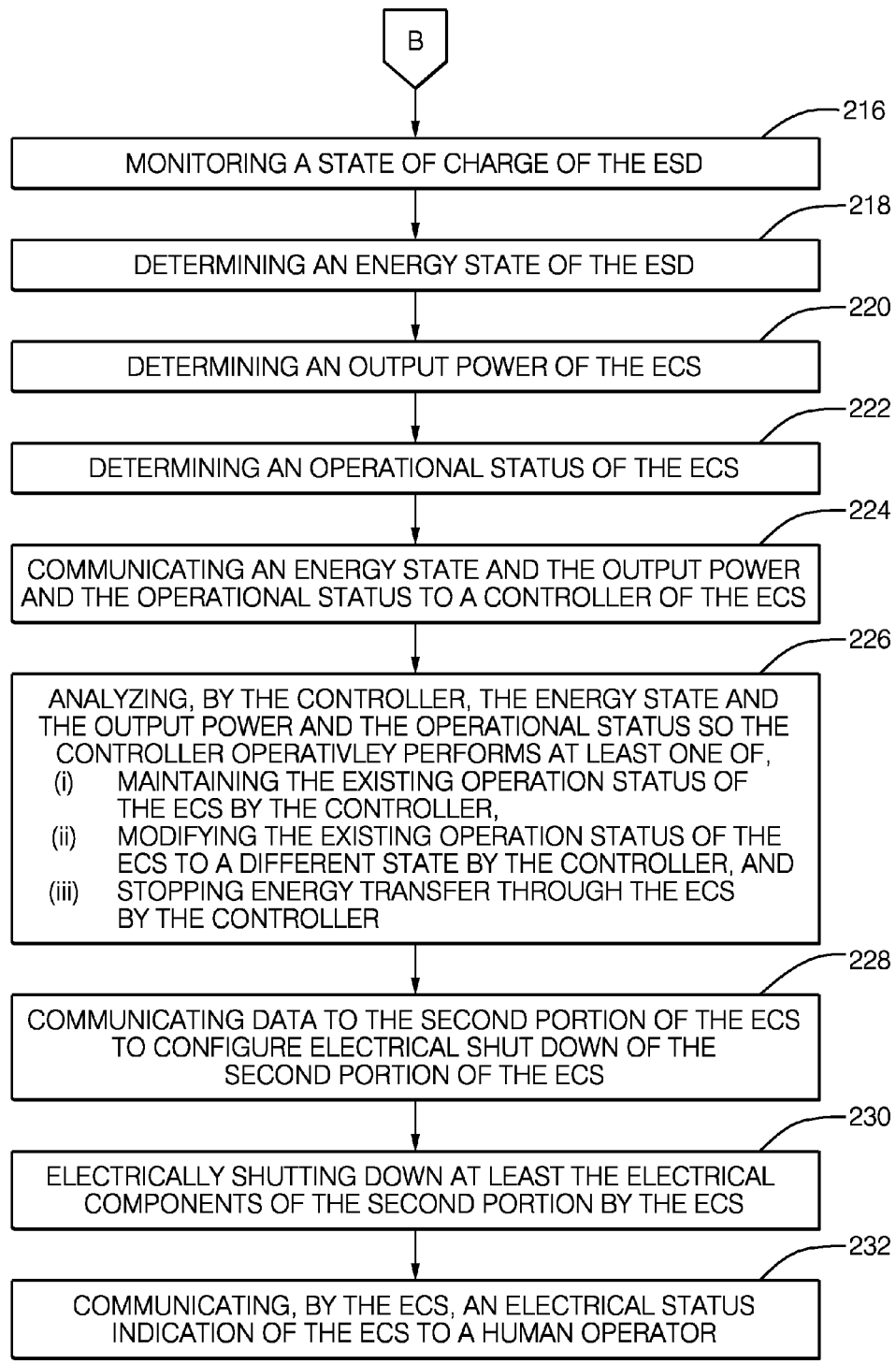
FIG. 11 shows additional steps of the method of FIG. 10.

Referring to FIGS. 10-11, when energy storage device 12 is in use a method 200 to transmit energy through electrical charging system 10 to electrically charge battery 12 is now presented. One step 202 in method 200 is providing electrical charging system 10 that includes power transmitter 14, energy coupling arrangement 28, at least one electrical signal shaping device 20, and wheel chock 37, as previously described herein. Another step 204 in method 200 is transmitting a pulse signal from off-vehicle inductive coil 16 to on-vehicle inductive coil 18. For example, one such pulse has a value of 50+/−10 Watts for a time period of 30+/−10 seconds. The pulse signal is sent out when an ignition key of vehicle 13 is in the OFF position and the inductive coils 16, 18 are aligned as previously described herein. Alternatively, the pulse signal may be sent out when the inductive coils are aligned as previously described herein regardless of the position of the ignition key. A further step 206 in method 200 is determining, by electrical charging system 10, a reflected power measurement of electrical charging system 10 as a function of the pulse signal. Another step 208 in method 200 is determining, by electrical charging system 10, a received power measurement as a function of the pulse signal. A further step 210 in method 200 is transferring the energy to electrically charge battery 12 by electrical charging system 10 when the reflected power measurement is less than a predetermined first threshold value and the received power measurement is greater than a predetermined second threshold value, and the predetermined second threshold value is greater than the predetermined first threshold value. Preferably, the predetermined first threshold value is 25% and the predetermined second threshold value is 75%. Should the requirements for the predetermined first and second thresholds not be met, fault electrical signals and electrical charging system diagnostic fault codes would be set. These fault codes would be sent to the vehicle through the vehicle data communication bus 60. For example, various faults that may be detected include temperature of the battery, battery state of health, battery state of charge, state of the vehicle harness to/from the battery to identify shorts, opens, and isolation in the harness, object detection between the inductive coils, temperature of the inductive coils, and coil damage between the inductive coils. During transferring step 210, electrical charging system 10 checks voltage and current amplitude and their corresponding phase relationship at cables 34 from power transmitter 14. Preferably, these electrical charging system voltage/current/phase checks are performed every 10+/−1 minute during step 210 of transferring the energy to battery and monitored by power transmitter 14. Step 210 may be interrupted by the human operator such as if the on/off button is pressed on power transmitter 14. Step 210 may also be interrupted by electrical signal shaping device 20 if electrical charging system 10 detects a vehicle fault as previously discussed herein. Another step 212 in method 200 is that step 210 of transferring the energy further includes starting an internal timer when step 210 of transferring the energy begins. A further step 213 in method 200 is monitoring temperature, respectively, at off-vehicle inductive coil 16 and at on-vehicle inductive coil 18 thereat. A further step 214 in method 200 is continuously determining the reflected power measurement and the received power measurement after the step of starting the internal timer. Another step 216 in method 200 includes when an electrical charging system power efficiency is less than a predetermined amount of system power efficiency and the internal timer is less than a threshold value and a value of the temperature is less than a predetermined amount, then monitor a state of electrical charge of battery 12 as listed in step 216. In yet another alternate embodiment, the predetermined amount of the system power efficiency is less than 75%, the internal timer is less than eight (8) hours, and the value of the temperature is less than 90 degrees Celsius. The step 216 of method 200 further includes a step 218 of determining an energy state of the energy storage device. A further step 220 of method 200 includes determining an output power of the electrical charging system, more particularly, an output power of power transmitter 14. Another step 222 of method 200 includes determining an operational status of the electrical charging system. The operational status of step 222 includes determining the magnitude of DC voltage or DC current that is being supplied to electrical signal shaping device 20. A further step 224 in method 200 includes communicating the energy state and the output power and the operational status determined in step 222 to controller portion of the controller/rectifier block 40 of electrical charging system 10. Another step 226 in method 200 includes analyzing, by the controller portion of the controller/rectifier block 40, the energy state, the output power and the status so the controller portion of the controller/rectifier block 40 operatively performs at least one of the following substeps: (i) maintaining an existing operation state as determined in step 222 of electrical charging system 10 by the controller portion of the controller/rectifier block 40, (ii) modifying the existing operation state of electrical charging system 10 to a different state by the controller portion of the controller/rectifier block 40, and (iii) stopping energy transfer through electrical charging system 10 by the controller portion of the controller/rectifier block 40. Method 200 also includes where the step of monitoring the state of electrical charge of battery 12 further includes a step 228 of communicating data to on-vehicle inductive coil 18 by electrical charging system 10 to configure electrical shutdown of on-vehicle inductive coil 18 by electrical charging system 10. If the electrical shutdown is not to occur a feedback loop back to step 216 allows for continued monitoring of the charge of the energy storage device and other parameters of the electrical charging system that are associated with method 200. A further step 230 in method 200 is electrically shutting down at least the electrical vehicular components of the electrical signal shaping device 20 that include of on-vehicle inductive coil 18 by electrical charging system 10. The power is also de-energized from power transmitter 14 to the off-vehicle inductive coil 16. The electrical charging system will also further interrogate whether the energy storage device 12 is at a fully charged electrical state. A further step in method 200 is communicating, by electrical charging system 10, an electrical status indication of electrical charging system 10 to operator 32. This may include, for example, and indication to the human operator that the energy storage device is fully electrically charged. If the energy storage device is not fully electrically charged and the electrical charging system is still electrically shutting down, information may be provided to the human operator through the user display of the power transmitter 14 the reason for the electrical charging system shutdown.

FIGS. 12-16 each illustrate an alternate embodiment of the invention in contrast with the embodiment of FIGS. 1-8. FIGS. 12-15 each have an electrical charging system that includes a primary electrical charging system and a secondary electrical charging system. The sey system is a conventional, low voltage 120 VAC, 60 Hz electrical charging system that is in electrical communication with the electrical signal shaping device of the primary system. One type of secondary system suitable for this purpose is described in U.S. Ser. No. 12/950,298 entitled "BATTERY CHARGER HAVING NON-CONTACT ELECTRICAL SWITCH" and another such system is described in U.S. Ser. No. 13/306,327, entitled "POWER SAFETY SYSTEM AND METHOD HAVING A PLURALITY OF THERMALLY-TRIGGERED ELECTRICAL BREAKING ARRANGEMENTS," each of which have been previously described herein. These secondary systems generally may include a ground-based power unit, an electrical connection from the power unit suitable for connection to an AC power source, a charge plug connector disposed on a charge couple handle that attaches to a vehicle-based charge receptacle, and a rectifier. Alternatively, the rectifier in the secondary system may not be utilized. Still yet alternatively, the secondary system may not be employed in any of the embodiments as illustrated in FIGS. 12-16. In some embodiments, a condition for the primary system to electrically charge the battery may include that the secondary system is not electrically charging the energy storage device during the same time period.

The embodiments of FIGS. 12-16 will now be further described below.

Electrical Charging System that Includes a Primary System Using Electrical Charging System of FIG. 4 and a Secondary System Referring to FIG. 12, electrical charging system 300 includes a primary electrical charging system 311 and a secondary electrical charging system 329 configured for electrical communication with primary electrical charging system 311 and used to electrically charge an energy storage device 312. Primary electrical charging system 311 is electrical charging system 10 as illustrated in the embodiment of FIGS. 1-8 as previously described herein. An electrical signal shaping device 320 is similar to electrical signal shaping device 20 in the embodiment of FIGS. 1-8, but only illustratively shows transfer switch 351 in FIG. 12. With the addition of secondary electrical charging system 329, an advantage of electrical charging system 300 is that it incorporates increased flexibility for a human operator of electrical charging system 311, such as operator 32 in the embodiment of FIG. 3, for electrically charging energy storage device 312. Increased flexibility translates into enhanced convenience for the human operator to electrically charge the battery in different electrical charging environments in which vehicle 313 may operate. Elements illustrated in the embodiment of FIG. 12 that are similar to the embodiment of FIGS. 1-8 have reference numerals that differ by 300, and are previously described herein.

When primary electrical charging system 311 is configured to electrically charge energy storage device 312, primary electrical charging system 311 provides a first electrical current to electrically charge energy storage device 312. When secondary electrical charging system 329 is configured to electrically charge battery 312, secondary electrical charging system 329 provides a second electrical current to electrically charge battery 312. Secondary electrical charging system 329 electrically communicates with primary electrical charging system 311 via transfer switch 351 of electrical signal shaping device 320 such that at least a portion of primary electrical charging system 311 provides an electrical transmission conduit for electrical current supplied by secondary electrical charging system 329 when secondary electrical charging system 329 is electrically charging energy storage device 312. Secondary electrical charging system 329 is in electrical communication with a 120 VAC, 60 Hz power source 321 and primary electrical charging system 311 is in electrical communication with power source 326 having a greater voltage that 120 VAC, such as 240 VAC. Each power source 321, 326 is disposed external to vehicle 313 and electrical charging system 300. An electrical output 355 of transfer switch 351 electrically feeds vehicular charger 324 and an electrical output of vehicular charger 324 feeds battery 312. Operation of transfer switch 351 is controlled by the controller portion of the controller/rectifier of electrical signal shaping device 320. The controller portion of the controller rectifier may receive data from the vehicle data communication bus similar to the embodiment as illustrated in FIG. 4 previously described herein that indicates whether the secondary system is coupled to the vehicle.

Primary and secondary electrical charging system 311, 329 are configured to respectively electrically charge energy storage device 312 only when respectively electrically connected to power sources 321, 326 disposed external to vehicle 313 and primary and secondary electrical charging system 311,

329. Preferably, power transmitter 314 is hardwired to power source 321 as previously described in the embodiment of FIG. 4. Secondary electrical charging system 329 is configured for being plugged in to power source 321 by a human operator. Preferably, power source 326 is 240 VAC, 60 Hz electrical signal and power source 321 is a 120 VAC, 60 Hz electrical signal. Alternatively, the power sources may be any voltage value that is effective to electrically charge the energy storage device in which the power source for the primary system is a greater voltage than the voltage of the power source for the secondary system. The first electrical current of primary electrical charging system 311 has a first frequency at output 333 of on-vehicle inductive coil 318 that is input in to electrical signal shaping device 320. A second electrical current at output 331 of secondary electrical charging system 329 that is input to electrical signal shaping device 320 has a second frequency. The first frequency has a greater frequency value than the second frequency. Typically, the frequency of output 331 of secondary electrical charging system 329 is 60 Hz.

Preferably, at least a portion of secondary electrical charging system 329 is disposed external to vehicle 313 and secondary electrical charging system 329 is configured to releasably couple with vehicle 313 in which a majority portion of secondary electrical charging system 329 resides external to vehicle 313. The primary and secondary electrical charging system 311, 329 may each electrically charge battery 312 with the same amount of electrical current, but primary electrical charging system 311 may electrically charge battery 312 in a less amount of time being supplied with power from a power source (not shown) produced from the 240 VAC, 60 Hz power source 326 than with a 120 VAC, 60 Hz power source 321.

In another alternate embodiment, when the secondary system is electrically charging the energy storage device, the electrical charging system prevents the primary system from also electrically charging the energy storage device. When secondary electrical charging system 329 electrically charges battery 312, primary electrical charging system 311 is configured to electrically break from electrically charging battery 312 by the controller portion of controller/rectifier block in electrical signal shaping device 320 selectively switching transfer switch 351. In one embodiment, controller portion of controller/rectifier block in primary electrical charging system 311 controls the operation of transfer switch 351 to select the coupled secondary electrical charging system 329 or primary electrical charging system 311 to electrically charge battery 312. Secondary electrical charging system 329 is configured to supply 50-60 Hz electrical current to energy storage device 312 when at least a portion of the electrical current supplied by the secondary electrical charging system 329 is electrically transmitted through at least a portion of primary electrical charging system 311 that is disposed on vehicle 313. Alternatively, the electrical charging system may be configured so that the secondary system may electrically charge the battery in combination with the primary system. Still yet alternatively, the secondary system may be any type of electrical charging system that is different from the primary system that is still useful to electrically charge the battery.

When the secondary system electrically charges the battery the vehicle's ignition should be in the OFF position. The vehicle's electronics generally communicate to the electrical charging system the maximum electrical charging current that it may accept. As long a portion of the secondary system is in communication with the vehicle, such as a handle of the secondary system, the vehicle is prevented from starting being put in to the RUN Ignition key position. The secondary system may include a pilot line signal that provides basic communication between the vehicle and the wall charger per the SAE J1772 standard. The pilot line ensures the vehicle knows how much power is available to the charger.

Secondary electrical charging system 329 is not in use when transfer switch 351 is not in a state that selects secondary electrical charging system 329 to electrically charge battery 312. Secondary electrical charging system 329 is also not in use if secondary electrical charging system 329 is not in electrical communication with power source 321.

Primary electrical charging system 311 is not in use when primary electrical charging system 311 disposed external to vehicle 313 is not electrically connected to power source 326. Primary electrical charging system 311 is also not in use when transfer switch 351 is not in a state that selects primary electrical charging system 311 to electrically charge battery 312.

Primary electrical charging system 311 is partially in use when primary electrical charging system 311 disposed external to vehicle 313 is electrically connected to power source 326 and on-vehicle inductive coil 318 of primary electrical charging system 311 does not wireless receive electromagnetic energy from the off-vehicle inductive coil 316 of primary electrical charging system 311.

Primary electrical charging system 311 is in use when primary electrical charging system 311 disposed external to vehicle 313 is electrically connected to power source 326 and on-vehicle inductive coil 318 of primary electrical charging system 311 wirelessly receives electromagnetic energy from off-vehicle inductive coil 316 of primary electrical charging system 311 to be shaped in to electrical current in electrical signal shaping device 328 of primary electrical charging system 311. Electrical current flows through electrical signal shaping device 328 when battery 312 requires electrical charge. Secondary electrical charging system 329 is in use when transfer switch 351 is in a state that selects secondary electrical charging system 329 to electrically charge battery 312 and when secondary electrical charging system 329 is in electrical communication to power source 321.

Figure 13:
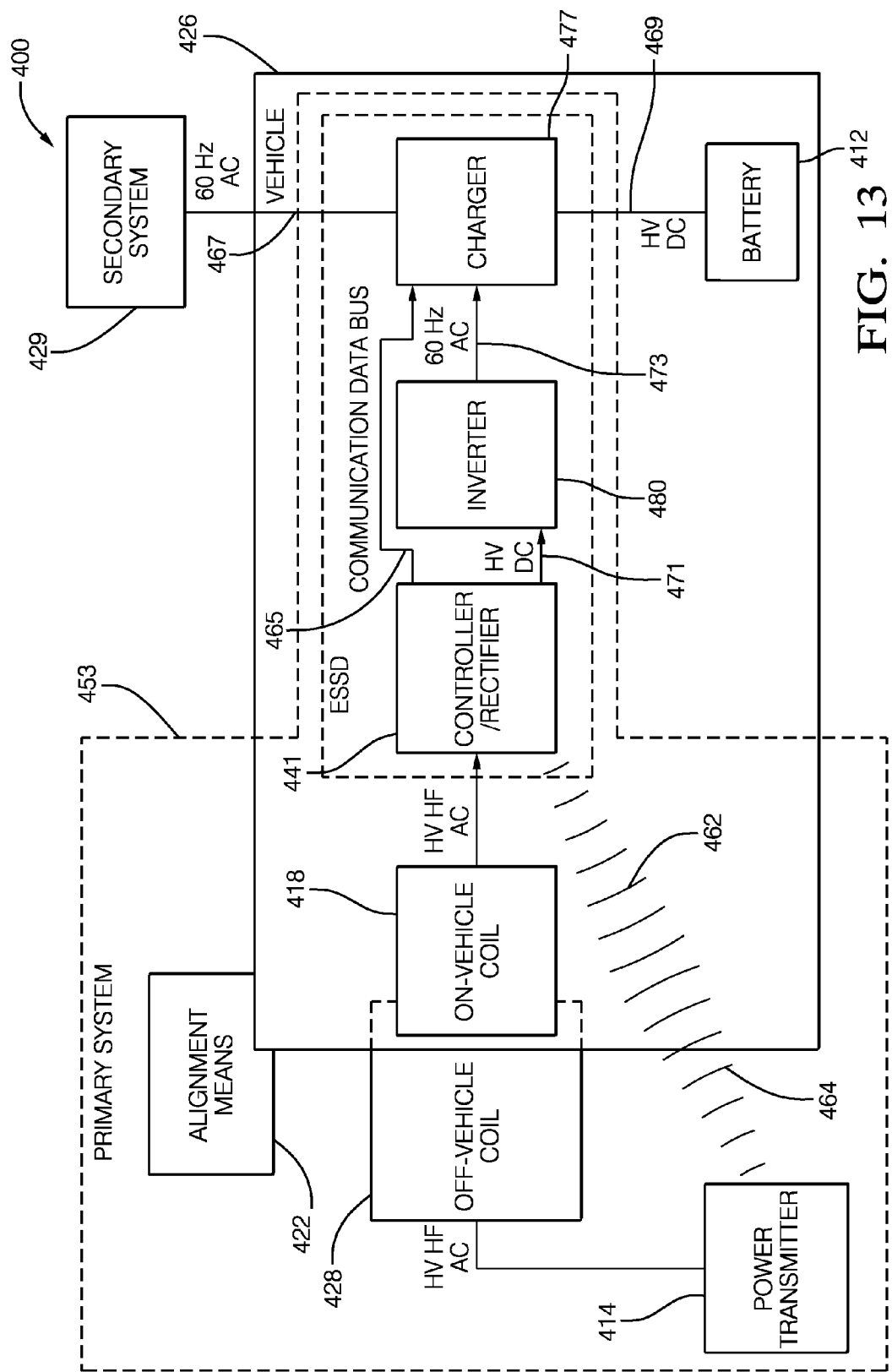
FIG. 13 shows an electrical charging system that includes a primary and a secondary system and an integral charger electrical device as part of the electrical charging system that has transfer switch functionality disposed therein, according to another alternate embodiment of the invention.

Electrical Charging System that Includes a Primary System Including an Integral Charger and an Inverter and a Secondary System Referring to FIG. 13, and electrical charging system 400 includes a primary system 453 and a secondary system 429. In contrast to the embodiment as illustrated in FIG. 12, primary system 453 includes an electrical signal shaping device 425 that contains a controller/rectifier block 441, an inverter 480, and an integral charger 477. The ballast resistor as illustrated in the embodiment of FIG. 4 is not used. The wireless volt meter functionality is integrated in to the controller portion of the controller/rectifier. Inverter 480 is disposed intermediate controller/rectifier block 441 and integral charger 477. Integral charger 477 includes the transfer switch functionality in contrast to charger 24 of the embodiment of FIGS. 1-8 that does not include the functionality of transfer switch 48. The controller of electrical signal shaping device 425 includes data bus communication 465 with integral charger 477 so that electrical charging system 400 may have enhanced operational control to electrically charge energy storage device 412. This enhanced operation control of electrical devices within electrical charging system 400 allows electrical charging system 400 to have increased system power efficiency when the energy storage device 412 is being electrically charged in contrast to the embodiment of FIG. 12 previously described herein. Secondary system 429 is similar to secondary electrical charging system 329 in the embodiment illustrated in FIG. 12 which is also previously described herein. An electrical output 467 of secondary electrical charging system 529 electrically feeds integral charger 477 and an electrical output 469 of integral charger 477 electrically feeds energy storage device 412. Elements in FIG. 13 that are similar to elements in the embodiment of FIG. 4 have reference numerals that differ by 400 unless otherwise noted.

A first frequency of a first electrical current input to controller/rectifier block 441 of primary system 453 has a greater frequency value than a second frequency of a second electrical current carried on output 467 of secondary system 429 as similarly previously described in the embodiment of FIG. 12. Controller/rectifier block 441 measures voltage, current and power as previously described in the embodiment of FIG. 4. Wireless signal paths 462, 464 transmit data as also previously described herein, however, the functionality of wireless voltmeter 44 in the embodiment of FIG. 4 is integrated in with the functionality of the controller portion of controller/rectifier block 441.

Figure 14:
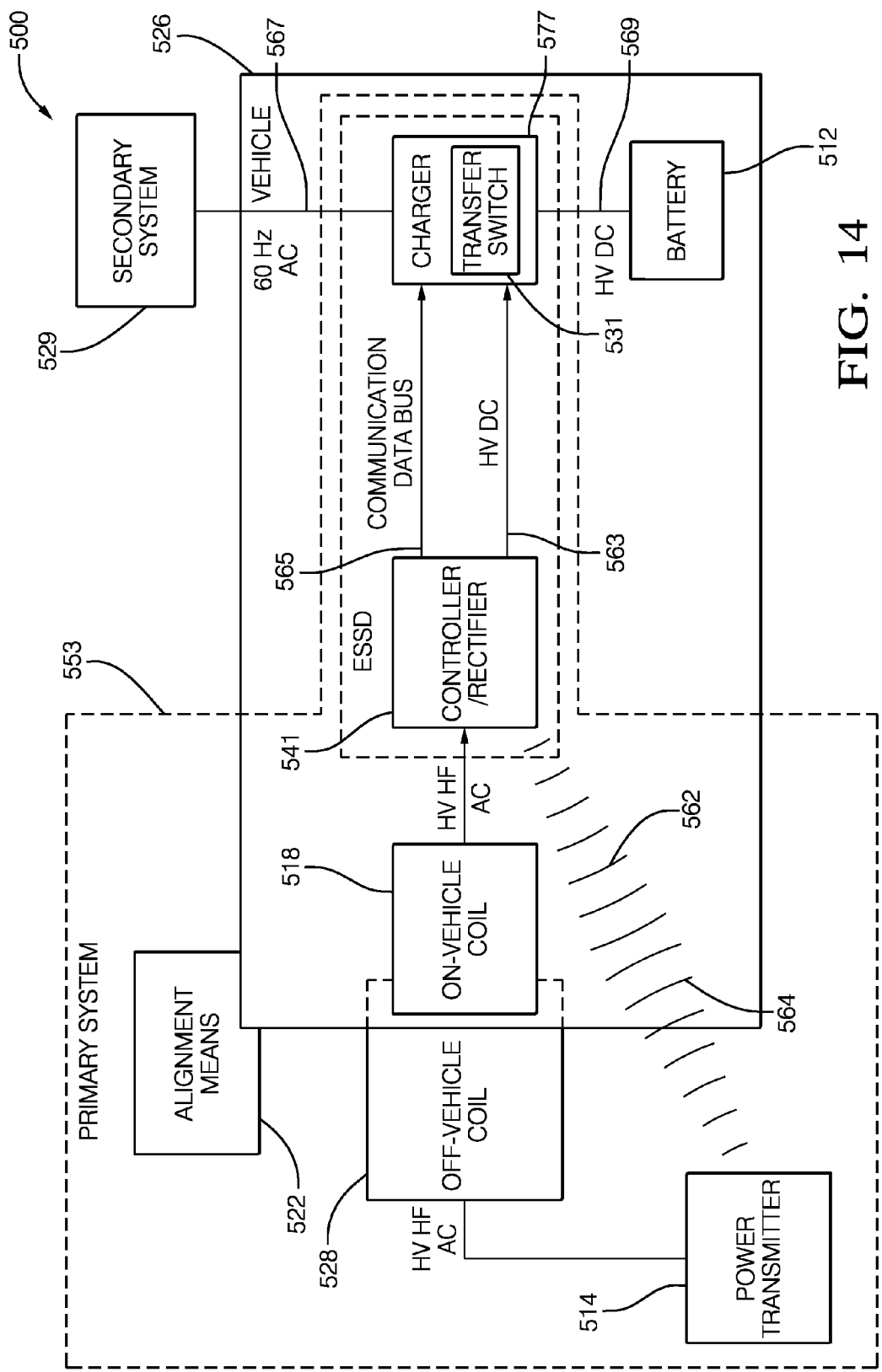
FIG. 14 shows an electrical charging system that includes a primary and a secondary system and an integral charger electrical device that includes transfer switch functionality is incorporated therein is included as part of the primary system while the inverter electrical device is removed therefrom, according to a further alternate embodiment of the invention.

Electrical Charging System that Includes a Primary System Including an Integral Charger with No Inverter Functionality and a Secondary System Referring to FIG. 14, an electrical charging system 500 includes a primary system 551 and a secondary electrical charging system 529. Secondary electrical charging system 529 is similar to secondary system 429 in the embodiment of FIG. 13 as previously described herein. An electrical signal shaping device 523 of primary system 551 includes an integral charger 577 similar to integral charger 477 in the embodiment of FIG. 13 as previously described herein. Integral charger 577 is in direct downstream electrical communication from a controller/rectifier block 541. In contrast to the electrical charging system embodiments of FIGS. 12 and 13, the transfer switch functionality is integrated in with integral charger 577 in electrical signal shaping device 523 and electrical signal shaping device 523 contains no inverter electrical device. Thus, the system power efficiency of electrical charging system 500 to electrically charge energy storage device 512 is improved due to integration of transfer switch within the integral charger 577 in combination with the elimination of the inverter. Elimination of the invertor also reduces the vehicular mass of the electrical charging system and hence, also the overall vehicle's mass. For example, the invertor device may weight may be upwards of 9.1 kilograms (20 pounds) in addition to increasing the overall system power efficiency due to the elimination of this one component. Reduced vehicular mass is desired so that the vehicle may travel further down the road than if the inverter was still disposed in the electrical charging system. Thus, the vehicle may desirably travel further on a given electrical charge of the energy storage device due to this reduced mass. The complexity of the electrical charging system also is decreased that also further reduces the cost to construct the electrical charging system. The controller portion of the controller/rectifier 541 directly electrically communicates with integral charger 577 via communication data bus 565 in similar fashion to the electrical charging system embodiment of FIG. 13. Elements in FIG. 14 that are similar to elements in the embodiment of FIG. 4 have reference numerals that differ by 500. An electrical output 567 of secondary electrical charging system 529 electrically feeds integral charger 577 and an electrical output 569 of integral charger 577 electrically feeds energy storage device 512.

A first frequency of a first electrical current input to controller/rectifier 541 of primary system 553 has a greater frequency value than a second frequency of a second electrical current carried on output 567 of secondary electrical charging system 529 as similarly previously described in the embodiment of FIG. 12. Controller/rectifier 541 measures voltage, current and power as previously described in the embodiment of FIG. 4. Wireless signal paths 562, 564 transmit data as previously described herein. The functionality of wireless voltmeter 44 in the embodiment of FIG. 4 is integrated in with the functionality of the controller portion of controller/rectifier 541 similar to the embodiment of FIG. 13.

Figure 15:
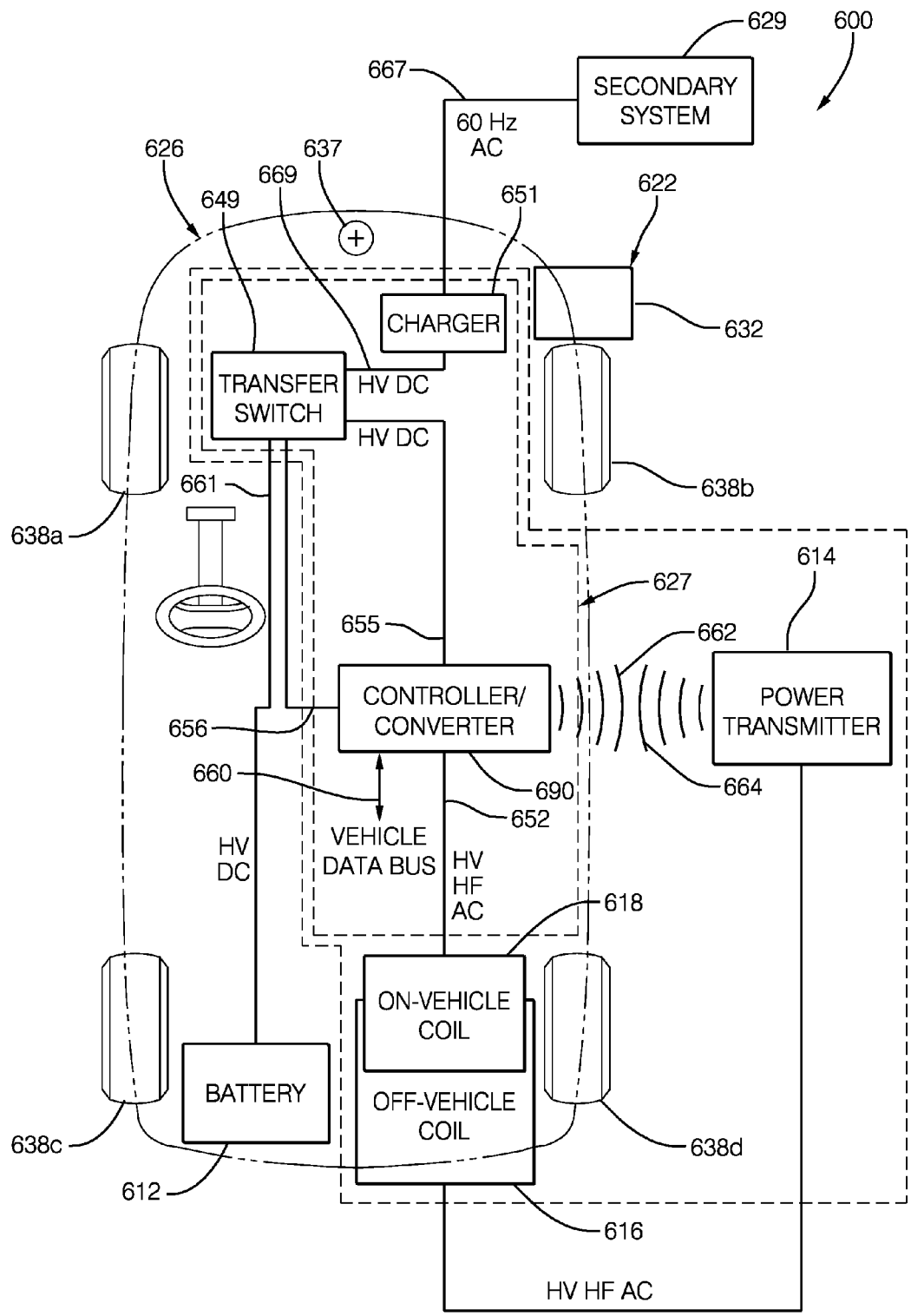
FIG. 15 shows a block diagram of a primary and a secondary system and the primary system includes a converter, according to another alternate embodiment of the invention.

Electrical Charging System that Includes a Primary System Including a Converter and a Secondary System Referring to FIG. 15, an electrical charging system 600 also includes a primary electrical charging system 601 and a secondary electrical charging system 629. Primary electrical charging system 601 includes a converter as part of a controller/converter block 690. Unless otherwise noted, elements in FIG. 15 that are similar to elements in the electrical charging system 10 of the embodiment of FIG. 4 have reference numerals that differ by 600 which are previously described herein. The converter portion of the controller/converter block 690 is in direct upstream electrical communication from a transfer switch 649. A charger 651 is in electrical communication with transfer switch 649. Transfer switch 649 is in direct electrical communication with energy storage device 612. Charger 651 does not include transfer switch functionality in contrast with the primary electrical charging system in the embodiments of FIGS. 13 and 14. There is no wireless volt meter electrical device or ballast resistor electrical device or inverter electrical device in contrast with the embodiment of FIG. 4. The functionality of the wireless voltmeter is integrated in with the controller portion of controller/converter block 690. Thus, with electrical charging system 600, a more simplified approach is realized that may have system power efficiency improvements along with electrical charging system 600 exerting more control in the electrical charging of energy storage device 612. Alternatively, the controller portion of the controller/convertor may communicate with the charger when the charger is included as part of the primary electrical charging system similar to the electrical charging system embodiments of FIGS. 14 and 15.

A first frequency of a first electrical current input to controller/converter block 690 of primary electrical charging system 601 has a greater frequency value than a second frequency of a second electrical current carried on output 667 from secondary electrical charging system 629 as similarly previously described in the embodiment of FIG. 12. Controller/converter block 690 measures voltage, current and power as previously described in the embodiment of FIG. 4. Wireless signal paths 662, 664 transmit data as previously described herein. The functionality of wireless voltmeter 44 in the embodiment of FIG. 4 is integrated in with the functionality of the controller portion of controller/converter block 690 similar to the embodiment of FIGS. 13-14.

Figure 16:
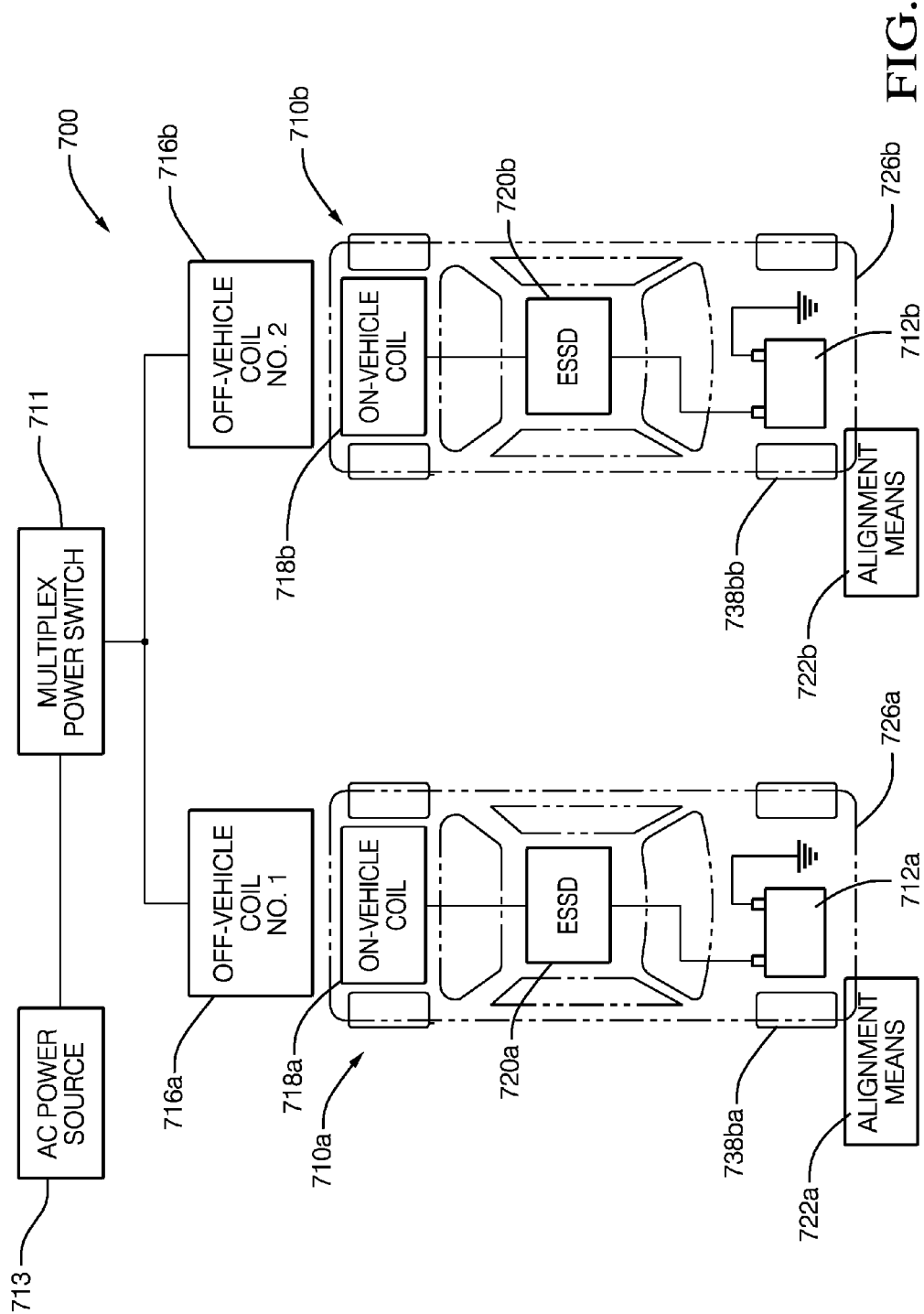
FIG. 16 shows a plurality of vehicles that respectively include the electrical charging system of FIG. 2 being simultaneously electrically charged through a multiplex power switch according to yet another alternate embodiment of the invention.

An Electrical Charging System that Includes a Multiswitch for Simultaneously Electrically Charging Energy Storage Devices in a Plurality of Vehicles Referring to FIG. 16, an electrical charging system 700 is illustrated for advantageously simultaneously electrically charging a plurality of batteries 712a, 712b disposed in a plurality of vehicles 726a, 726b. Electrical charging system 700 includes a high frequency AC power source 713, a multiplex power switch 711 disposed intermediate to, and in electrical communication with AC power source 713 and off-vehicle inductive coil No. 1 716a and off-vehicle inductive coil No. 2 716b. In one embodiment, the high frequency power source has a frequency of greater than 100 kHz. Electrical charging system 710a, 710b are similar to electrical charging system 10 as described in the embodiment as illustrated in FIGS. 1-8 previously described herein. Alternatively, any type of electrical charging system as described herein may be disposed in these plurality of vehicles. For example, and multiswitch electrical charging system may be constructed to simultaneously electrically charge the electrical charging system illustrated in FIG. 15. Still yet alternatively, the electrical charging system of FIG. 16 may be configured to electrically charge any type of electrical charging system, such as those presented herein. For instance, one vehicle may have the electrical charging system of FIG. 4 and another vehicle may have the electrical charging system of FIG. 13, and yet another vehicle may have the electrical charging system of FIG. 14 in which all the energy storage device's may be simultaneously electrically charged.

Vehicles 726a, 726b have alignment means 722a, 722b and electrical signal shaping devices 720a, 720b that include on-vehicle inductive coils 718a, 718b similar to the electrical charging system described in the embodiment of FIGS. 1-11. Alignment means 722a, 722b respectively engage with tires 738ba, 738bb of vehicles 726a, 726b. Multiplex power switch 711 is a single switch configured to multiplex power from AC power source 713 to off-vehicle inductive coils 716a, 716b. When electrical charging system 700 is operating to electrically charge batteries 712a, 712b, the supply of power from AC power source 713 may be further be switched among vehicles 726a, 726b where it is detected by electrical charging system 700 that electromagnetic energy transmission/reception occurs between inductive coils 716a & 718a, 716b & 718b.

Alternatively, the alignment means may also be a wheel intention structure in which a portion of a perimeter of the structure has raised edges that is secured to the ground surface. The wheel intention structure is such that a tire of the vehicle fits into the intention portion of the structure, so that when disposed in the structure at least a portion of the on-vehicle inductive coil overlies at least a portion of the off-vehicle inductive coil.

Alternatively, the alignment means may further include other aligning members working together or in combination with the wheel chock to increase the reliability of the off-vehicle and on-vehicle inductive coils being in alignment for effective electromagnetic energy transfer between the inductive coils. Still yet alternatively, the alignment means may be the human operator positioning the vehicle so that the on-vehicle inductive coil and the off-vehicle inductive coil are positioned relative to one another so that the battery may be electrically charged without the use of a wheel chock.

Alternatively, the electrical charging system may not include an alignment means and still be within the spirit and scope of the invention.

Still alternatively, a 60 Hz, 120 VAC pluggable secondary electrical charging system may be included or not included in any of the embodiments described herein and still be within the spirit and scope of the invention. The use of the secondary system is dependent on the electrical application of use.

In another alternate embodiment, an electrical charging system may include electrical charging system data transmission between the inductive coils in combination to electromagnetic energy transfer. The transmission of electrical charging system and/or vehicle data between the inductive coils disposed in the electrical charging system may advantageously reduce the parts complexity of the electrical charging system as the wireless links between the power transmitter and the controller portion of the controller/rectifier may not be needed. Additionally, the wireless volt meter component may also not be needed. Vehicle data from the vehicle data bus may also be configured for wireless transmission through the first and the second inductive coil.

In a further alternate environment, the electrical charging system may be configured to send electrical charging system status or fault information out as a text message to the human operator's cell phone. This provides another convenience to the human operator in using the electrical charging system to ensure the battery is fully charged when the vehicle is used again by the human operator.

In yet another alternate embodiment, the power system efficiency of the electrical charging system may have any percentage value between 0% and 100%.

In still another alternate embodiment, the wheel chocks may be electrically wired with sensors in electrical communication with the electrical charging system for enhanced operation of the electrical charging system. The tire of the vehicle making contact with the wheel chock may yet be a further requirement for the electrical charging system to operate to electrically charge the battery.

In other electrical application embodiments, the correct alignment of the inductive coils to produce a certain amount of system power efficiency of the electrical charging system may automatically shut down the motor and/or the engine of the vehicle. Such information may be transmitted from the electrical charging system to the vehicle over the vehicle data bus.

In yet another alternate embodiment, a pad may be placed on the ground surface that shows a user where to ideally locate the off-vehicle inductive coil and the wheel chock for optimal electrical charging system performance for a given vehicle of interest during initial set-up of the electrical charging system.

In still another alternate embodiment, the charger may not be integrated within the electrical charging system, but rather may be included as part of the vehicular electronics.

Thus, a reliable and robust vehicular electrical charging system that includes a controller has been presented that advantageously allows for consistent alignment of respective inductive coils in relation to one another using a properly positioned wheel chock so that the battery disposed on the vehicle may be electrically charged. The wheel chock assists the human operator of the vehicle to positionally move the vehicle such that consistent alignment of the inductive coils is attained so that electromagnetic energy is effectively transmitted/received between the corresponding inductive coils. Having a single, integrated power transmitter that includes a DC supply, an RF amp, a wireless communication control, and a user interface provides up-integration of feature content. The user interface of the power transmitter ensures the electrical charging system is easier to operate for the human operator and has fewer distinct electrical component parts which may further decrease the cost to manufacture the electrical charging system. These features may allow the electrical charging system to electrically charge or recharge the battery without the hassle of plug-in or charging cords so that the electrical charging system is convenient and easy to use for a human operator of the electrical charging system. The lack of plugging in power cords for the high power electrical charging system desirably may also assist to keep the clothing and hands of the human operator away from dirt and debris that may have accumulated on the vehicle's exterior surfaces. Further, there is no loose charging cord for the human operator to step over or otherwise wind up for further storage. Again, this provides further convenience for the human operator of the electrical charging system. The human operator simply drives the vehicle into the aligning position with the assistance of the wheel chock and exits the vehicle in a typical, normal fashion and allows the electrical charging system to electrically charge the battery of the vehicle. These convenience features of the electrical charging system may also further assist to accommodate drivers with physical challenges. The wireless electromagnetic transmission/reception between the inductive coils further allows electrical charging of the battery without physical contact by the human operator which allows for a more convenient charging experience for the human operator. Electromagnetic energy transfer also advantageously allows a larger positional misalignment between the inductive coils that translates into larger parking misalignment for the vehicle while still having the battery conveniently electrically charged. The high power electrical charging system operates at frequencies that are greater than 60 Hz. This allows for larger misalignments between the inductive coils that still allow for increases system power efficiency as compared to a low frequency, low voltage 60 Hz system. Operation at higher frequencies allows the high power electrical charging system to have physically smaller-sized electrical components for fabrication of the electrical charging system which may not be realized if a lower frequency electrical charging system is used. The electrical charging system is operational when the inductive coils are appropriately aligned and an ON/OFF switch on the power transmitter has been activated by the human operator. The electrical charging system may include a primary and a secondary electrical charging system that allow operation of the electrical charging system in a variety of operating conditions that provides additional flexibility and convenience for the human operator to electrically charge the battery. This type of primary/secondary system mechanization may allow electric vehicle drivers the ability to electrically charge the vehicle when they are away from the fixed charging source. Energy is transmitted through the electrical charging system in a manner using receive and reflected power measurements to ensure a 75% or higher system power efficiency for the electrical charging system which may lower the operating costs of the electrical charging system for the human operator. The charger functionality may be included as part of the electrical charging system providing the electrical charging system even more control over how effective and efficiently the battery receives electrical charge. A variety of electrical charging system configurations may be employed as previously described herein that is dependent on the electrical application of use. One configuration uses an inverter, another configuration an integrated charger, and a third configuration uses a converter. The electrical charging system may eliminate the inverter so that a lower part count is realized for the electrical charging system, a higher system efficiency of the electrical charging system is achieved, and the electrical charging system has an overall lower weight, or mass. The electrical charging system may also be formed in a manner to electrically charge a plurality of vehicles using a multiplex power switch that may be useful in parking garages and parking lots where a multitude of vehicles may frequent. The multiplex power switch approach may help advance a global infrastructure for electric vehicle electrical charging.

It will be readily understood by those persons skilled in the art that the present invention is susceptible of broad utility and application. Many embodiments and adaptations of the present invention other than those described above, as well as many variations, modifications and equivalent arrangements, will be apparent from or reasonably suggested by the present invention and the foregoing description, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the following claims and the equivalents thereof.

We claim:

1. An electrical charging system to electrically charge an energy storage device of a vehicle, comprising:

a power transmitter configured to provide energy;

an energy coupling arrangement having an off-vehicle inductive coil and an on-vehicle inductive coil, the off-vehicle coil being disposed external to the vehicle and in electrical communication with the power transmitter and the on-vehicle coil being disposed on the vehicle, the on-vehicle coil being configured to receive at least a portion of the energy wirelessly transmitted from the off-vehicle coil; and an electrical signal shaping device in electrical communication with the on-vehicle coil to electrically shape a portion of said received energy and electrically transmit said electrically-shaped energy to electrically charge the energy storage device, and the electrical signal shaping device-includes a controller, wherein electrical signal shaping device further includes a transfer switch in downstream electrical communication with the on-vehicle coil, wherein the energy storage device is in downstream electrical communication with the transfer switch, wherein an amplifier in the power transmitter is periodically activated by the electrical charging system to determine if the vehicle is in a distance range with the off-vehicle coil effective for the on-vehicle coil to receive energy wirelessly transmitted from the off-vehicle coil, wherein a data message is electrically transmitted from the power transmitter to the electrical signal shaping device and then further electrically transmitted to electronic devices in the vehicle to indicate to the electronic devices in the vehicle that electrical charging of the energy storage device by the electrical charging system is available, wherein the data message is acknowledged by the vehicular electronic devices to the electrical charging system, wherein the vehicular electronic devices determine that electrical charging system charging conditions to electrically charge the energy storage device are met, wherein an electrical charge request is transmitted from the vehicle to the power transmitter, wherein the electrical charge request is acknowledged by the vehicle to the electrical charging system, wherein a required charge voltage message is transmitted by the vehicle to the electrical charging system, wherein the required charge voltage message is acknowledged by the electrical charging system, whereby the electrical charging system adjusts a voltage of the electrical charging system to electrically charge the energy storage device, wherein the transfer switch is energized by the electrical charging system, wherein a ready to electrically charge data message is transmitted from the vehicular electronic devices to the electrical charging system, wherein the ready to electrically charge message is acknowledged by the electrical charging system to the vehicular electronic devices, and wherein the energy storage device is electrically charged by the electrical charging system.

2. The electrical charging system according to claim 1, wherein the power transmitter includes:
- a housing enclosing a plurality of electrical components including at least a first portion, a second portion, and a third portion of electrical components in the plurality of electrical components;
- an electrical output extending from the second portion and in electrical communication with the off-vehicle coil;
- a DC power supply formed from the first portion of electrical components;
- an amplifier formed from the second portion of electrical components, the amplifier further being in electrical communication with the DC power supply; and
- a user interface formed from the third portion of electrical components, the user interface provides operating condition information of the electrical charging system to a human operator of the electrical charging system.

3. The electrical charging system according to claim 2, wherein the user interface has at least one visual element seen by eyes of the human operator.

4. The electrical charging system according to claim 2, wherein the user interface comprises at least one provision that allows a human operator of the electrical charging system to command the electrical charging system to perform at least one operation.

5. The electrical charging system according to claim 2, wherein the user interface includes at least one of:
 (i) a light emitting diode (LED),
 (ii) a LCD display,
 (iii) a LED display, and
 (iv) at least one push button.

6. The electrical charging system according to claim 2, wherein the plurality of electrical components includes a fourth portion of electrical components and the power transmitter further includes a wireless data communication section formed from the fourth portion of the plurality of electronic components, and the data communication section electrically wirelessly communicates with the controller disposed in the electrical signal shaping device.

7. A method to electrically charge an energy storage device in a vehicular electrical charging system, comprising the steps of:
- providing the electrical charging system that includes a power transmitter, an energy coupling arrangement, at least one electrical signal shaping device that includes a controller, wherein the energy coupling arrangement includes an off-vehicle coil and an on-vehicle coil, the off-vehicle coil is in electrical communication with the power transmitter and the on-vehicle coil being disposed on the vehicle, and the electrical signal shaping device is in electrical communication with the on-vehicle coil;
- periodically activating an amplifier in the power transmitter by the electrical charging system to determine if the vehicle is in a distance range with the off-vehicle coil effective for the on-vehicle coil to receive energy wirelessly transmitted from the off-vehicle coil;
- electrically transmitting a data message from the power transmitter to the electrical signal shaping device that is further electrically transmitted to electronic devices in the vehicle to indicate to the electronic devices in the vehicle that electrical charging of the energy storage device by the electrical charging system is available;
- acknowledging the data message by the vehicular electronic devices to the electrical charging system;
- determining, by the vehicular electronic devices, that electrical charging system charging conditions to electrically charge the energy storage device are met;
- transmitting an electrical charge request from the vehicle to the power transmitter;
- acknowledging the electrical charge request by the vehicle to the electrical charging system;
- transmitting a required charge voltage message by the vehicle to the electrical charging system;
- acknowledging the required charge voltage message by the electrical charging system so that the electrical charging system adjusts a voltage of the electrical charging system to electrically charge the energy storage device;
- energizing the transfer switch by the electrical charging system;
- transmitting a ready to electrically charge data message from the vehicular electronic devices to the electrical charging system;
- acknowledging the ready to electrically charge message by electrical charging system to the vehicular electronic devices; and
- electrically charging the energy storage device by the electrical charging system.

8. The method according to claim 7, wherein the electrical charging system charging conditions include,
 (i) the vehicle is not being electrically charged by a plug-in charger system,
 (ii) the energy storage device requires electrical charging,
 (iii) vehicle's transmission is in a park position,
 (iv) an ignition key of the vehicle is in an OFF position, and
 (v) at least a portion of the vehicle's power is de-energized.

9. The method according to claim 7, wherein when the energy storage device has a full state of electrical charge, and the method further includes the steps of:
- electrically transmitting a charge complete data massage from the vehicular electrical devices to the electrical charging system;
- acknowledging, by the electrical charging system, the charge complete data message;
- de-energizing the amplifier of the power transmitter of the electrical charging system and the transfer switch of the electrical charging system by the electrical charging system; and
- electrically transmitting a power off data message to the vehicular electronic devices by the electrical charging system.

* * * * *